US012804667B2

(12) United States Patent

Elshafie et al.

(10) Patent No.: US 12,804,667 B2
(45) Date of Patent: *Nov. 17, 2026

(54) CONFIGURATION AND SIGNALING FOR DIFFERENT MODULATION ORDERS

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 18/652,388

(22) Filed: May 1, 2024

(65) Prior Publication Data

US 2024/0284471 A1 Aug. 22, 2024

Related U.S. Application Data

(63) Continuation of application No. 17/459,900, filed on Aug. 27, 2021, now Pat. No. 11,991,714.

(51) Int. Cl.
*H04W 72/23* (2023.01)
*H04L 1/00* (2006.01)
(Continued)

(52) U.S. Cl.
CPC ........... *H04W 72/23* (2023.01); *H04L 1/0004* (2013.01); *H04L 1/0009* (2013.01); *H04L 5/0048* (2013.01); *H04L 27/36* (2013.01)

(58) Field of Classification Search
CPC .... H04W 72/23; H04L 1/0004; H04L 1/0009; H04L 5/0048; H04L 27/36
See application file for complete search history.

(56) References Cited

U.S. PATENT DOCUMENTS

| | | | |
|---|---|---|---|
| 11,122,551 B2 | 9/2021 | Kwon et al. |
| 11,689,314 B2 | 6/2023 | Sarkis et al. |

(Continued)

FOREIGN PATENT DOCUMENTS

| | | |
|---|---|---|
| WO | 2017171956 A1 | 10/2017 |
| WO | 2020003542 A1 | 1/2020 |

OTHER PUBLICATIONS

3GPP TS 38.214: "5G, NR, Physical Layer Procedures for Data", 3rd Generation Partnership Project, TSG RAN, NR, Physical Layer Procedures for Data (Release 15), ETSI, Technical Specification, Mobile Competence Centre, 650, Route Des Lucioles, F-06921 Sophia-Antipolis Cedex, France, vol. RAN WG1, No. V15.2.0 (Jun. 2018), Jun. 29, 2018, XP051474491, 95 Pages, Section 5.2.2.3.1, p. 26-p. 87, sections 5.1.3, 5.1.6.3.

(Continued)

*Primary Examiner* — Ronald B Abelson
(74) *Attorney, Agent, or Firm* — Holland & Hart, LLP

(57) ABSTRACT

Methods, systems, and devices for wireless communications are described for indicating modulation order and code rate for transmissions between a user equipment (UE) and a base station. The base station may configure one or more parameter tables that provide mapping between a modulation and coding scheme (MCS) index and the modulation order and code rate. The one or more tables may be explicitly indicated in configuration signaling, may be configured based on a frequency range for communications or a reference signal configuration, or any combinations thereof. The base station may transmit control information to the UE that indicates the MCS index value and that indicates a first table of multiple configured tables is to be used to determine the modulation order and code rate.

18 Claims, 18 Drawing Sheets

(51) Int. Cl.
*H04L 5/00* (2006.01)
*H04L 27/36* (2006.01)

(56) References Cited

U.S. PATENT DOCUMENTS

| | | | |
|---|---|---|---|
| 2014/0169297 | A1 | 6/2014 | Kim et al. |
| 2015/0117568 | A1 | 4/2015 | Wang et al. |
| 2015/0163773 | A1 | 6/2015 | Wang et al. |
| 2015/0195819 | A1 | 7/2015 | Kwon et al. |
| 2015/0381310 | A1 | 12/2015 | Hammarwall et al. |
| 2016/0337150 | A1 | 11/2016 | Larsson et al. |
| 2018/0323902 | A1 | 11/2018 | Rico Alvarino et al. |
| 2019/0215095 | A1 * | 7/2019 | Park .................. H04W 72/0453 |
| 2019/0238257 | A1 | 8/2019 | Hosseini et al. |
| 2020/0106550 | A1 | 4/2020 | Yoshimoto et al. |
| 2020/0412431 | A1 | 12/2020 | Park et al. |
| 2021/0368539 | A1 | 11/2021 | Zewail et al. |
| 2023/0064653 | A1 | 3/2023 | Elshafie et al. |
| 2023/0065810 | A1 | 3/2023 | Elshafie et al. |

OTHER PUBLICATIONS

Intel Corporation: "Remaining Details on PT-RS", 3GPP TSG RAN WG1 Meeting NR#3, R1-1716301, 3rd Generation Partnership Project, Mobile Competence Centre, 650, Route Des Lucioles, F-06921 Sophia-Antipolis Cedex, France, vol. Ran WG1, No. Nagoya, Japan, Sep. 18, 2017-Sep. 21, 2017, Sep. 17, 2017, pp. 1-10, XP051339757, Section 2.

International Search Report and Written Opinion—PCT/US2022/040741—ISA/EPO—Dec. 7, 2022 (2104359WO).

NTT Docomo., et al., "Maintenance for Reference Signals and QCL", 3GPP TSG RAN WG1 Meeting #94, R1-1809139, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018, 17 Pages, XP051516509, The whole document.

* cited by examiner

CONFIGURATION AND SIGNALING FOR DIFFERENT MODULATION ORDERS

CROSS REFERENCE

The present application for patent is a continuation of U.S. patent application Ser. No. 17/459,900 by ELSHAFIE et al., entitled "CONFIGURATION AND SIGNALING FOR DIFFERENT MODULATION ORDERS," filed Aug. 27, 2021, assigned to the assignee hereof, and expressly incorporated by reference herein.

FIELD OF TECHNOLOGY

The following relates to wireless communications, including configuration and signaling for different modulation orders.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and base station may communicate according to a modulation and coding scheme in which a modulation order and code rate for communications is set based on channel conditions between the UE and base station. In some cases a UE may measure channel conditions and transmit a measurement report to the base station, which may set the modulation and coding scheme based at least in part on the channel conditions. Efficient techniques for signaling the channel conditions and modulation and coding scheme are thus desirable to help enhance network efficiency and reliability.

SUMMARY

The described techniques relate to improved methods, systems, devices, and apparatuses that support configuration and signaling for different modulation orders. In accordance with various aspects, described techniques provide for configuration of one or more parameter tables that provide mapping between a modulation and coding scheme (MCS) index and a modulation order and code rate. In some cases, a base station may provide configuration information to a user equipment (UE) that indicates one or more tables that are configured for communications. In some cases, the one or more tables are configured based at least in part on a frequency range for communications, a reference signal configuration, or any combinations thereof. The base station may transmit control information to the UE that indicates a parameter index value that may be used to determine a modulation order and code rate for communications. In some cases, the control information may include a first subset of bits that indicate the parameter index value and a second subset of bits that indicate a first table of two or more configured tables is to be used to determine transmission parameters including modulation order and code rate.

A method for wireless communication at a user equipment (UE) is described. The method may include receiving, from a base station, configuration information for two or more transmission parameter tables that provide one or more transmission parameters for two or more different modulation orders for communications between the base station and the UE, receiving, from the base station, control signaling that indicates a parameter index value for one of the two or more transmission parameter tables, selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof, and receiving a shared channel transmission from the base station based at least on part on a modulation order and target code rate that are indicated by the first transmission parameter table at an entry associated with the parameter index value.

An apparatus for wireless communication at a UE is described. The apparatus may include a processor, memory coupled with the processor, and instructions stored in the memory. The instructions may be executable by the processor to cause the apparatus to receive, from a base station, configuration information for two or more transmission parameter tables that provide one or more transmission parameters for two or more different modulation orders for communications between the base station and the UE, receive, from the base station, control signaling that indicates a parameter index value for one of the two or more transmission parameter tables, select a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof, and receive a shared channel transmission from the base station based at least on part on a modulation order and target code rate that are indicated by the first transmission parameter table at an entry associated with the parameter index value.

Another apparatus for wireless communication at a UE is described. The apparatus may include means for receiving, from a base station, configuration information for two or more transmission parameter tables that provide one or more transmission parameters for two or more different modulation orders for communications between the base station and the UE, means for receiving, from the base station, control signaling that indicates a parameter index value for one of the two or more transmission parameter tables, means for selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof, and means for receiving a shared channel transmission from the base station based at least on part on a modulation order and target code rate that are indicated by the first transmission parameter table at an entry associated with the parameter index value.

A non-transitory computer-readable medium storing code for wireless communication at a UE is described. The code may include instructions executable by a processor to receive, from a base station, configuration information for two or more transmission parameter tables that provide one or more transmission parameters for two or more different modulation orders for communications between the base station and the UE, receive, from the base station, control signaling that indicates a parameter index value for one of the two or more transmission parameter tables, select a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof, and receive a shared channel transmission from the base station based at least on part on a modulation order and target code rate that are indicated by the first transmission parameter table at an entry associated with the parameter index value.

In some examples of the method, apparatuses, and non-transitory computer-readable medium described herein, the parameter index value includes a first subset of bits and a second subset of bits, where the first subset of bits indicates a first type of transmission parameter table, and the second subset of bits that provide the parameter index value. In some examples of the method, apparatuses, and non-transitory computer-readable medium described herein, the second subset of bits include a number of bits that is based on a size of the first transmission parameter table. In some examples of the method, apparatuses, and non-transitory computer-readable medium described herein, the first transmission parameter table is selected based on a configuration of one or more higher modulation order transmission parameter tables. In some examples of the method, apparatuses, and non-transitory computer-readable medium described herein, the configuration information includes radio resource control (RRC) configuration information for a physical downlink shared channel (PDSCH) configuration. In some examples of the method, apparatuses, and non-transitory computer-readable medium described herein, the configuration information further includes RRC configuration information for a semi-persistent scheduling (SPS) configuration.

In some examples of the method, apparatuses, and non-transitory computer-readable medium described herein, the selecting the first transmission parameter table is based on a set of rules and one or more of a higher layer parameter that configures one or more higher modulation order transmission parameter tables, a downlink control information (DCI) format, whether the UE may be configured with one or more types of radio network temporary identifiers (RNTIs), or any combinations thereof. In some examples of the method, apparatuses, and non-transitory computer-readable medium described herein, the one or more higher modulation order transmission parameter tables include a combined transmission parameter table in which 1024QAM and 4096QAM modulation order parameters are combined into a single high spectral efficiency (SE) table.

In some examples of the method, apparatuses, and non-transitory computer-readable medium described herein, the selecting the first transmission parameter table is based on a reference signal density indicated by the reference signal configuration provided to the UE. In some examples of the method, apparatuses, and non-transitory computer-readable medium described herein, a higher order transmission parameter table is selected as the first transmission parameter table based on a phase tracking reference signal (PTRS) configuration that provides a PTRS density that exceeds a threshold value.

In some examples of the method, apparatuses, and non-transitory computer-readable medium described herein, the first transmission parameter table indicates a modulation order and code rate for uplink shared channel transmissions from the UE that use a modulation order of 256QAM and 1024QAM. In some examples of the method, apparatuses, and non-transitory computer-readable medium described herein, a set of multiple transmission parameter tables may be configured separately for different frequency ranges used for communications between the UE and the base station, for different spectral efficiencies used for communications between the UE and the base station, or any combinations thereof.

A method for wireless communication at a base station is described. The method may include transmitting, to a UE, configuration information for two or more transmission parameter tables that provide one or more transmission parameters for two or more different modulation orders for communications between the base station and the UE, selecting a first transmission parameter table of the two or more transmission parameter tables and a parameter index value from the first transmission parameter table for communications with the UE, transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof, and transmitting a shared channel transmission to the UE based at least on part on a modulation order and target code rate that are indicated by the first transmission parameter table at an entry associated with the parameter index value.

An apparatus for wireless communication at a base station is described. The apparatus may include a processor, memory coupled with the processor, and instructions stored in the memory. The instructions may be executable by the processor to cause the apparatus to transmit, to a UE, configuration information for two or more transmission parameter tables that provide one or more transmission parameters for two or more different modulation orders for communications between the base station and the UE, select a first transmission parameter table of the two or more transmission parameter tables and a parameter index value from the first transmission parameter table for communications with the UE, transmit, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof, and transmit a shared channel transmission to the UE based at least on part on a modulation order and target code rate that are indicated by the first transmission parameter table at an entry associated with the parameter index value.

Another apparatus for wireless communication at a base station is described. The apparatus may include means for transmitting, to a UE, configuration information for two or more transmission parameter tables that provide one or more transmission parameters for two or more different modulation orders for communications between the base station and the UE, means for selecting a first transmission parameter table of the two or more transmission parameter tables and a parameter index value from the first transmission parameter table for communications with the UE, means for transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof, and means for transmitting a shared channel transmission to the UE based at least on part on a modulation order and target code rate that are indicated by the first transmission parameter table at an entry associated with the parameter index value.

A non-transitory computer-readable medium storing code for wireless communication at a base station is described. The code may include instructions executable by a processor to transmit, to a UE, configuration information for two or more transmission parameter tables that provide one or more transmission parameters for two or more different modulation orders for communications between the base station and the UE, select a first transmission parameter table of the two or more transmission parameter tables and a parameter index value from the first transmission parameter table for communications with the UE, transmit, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof, and transmit a shared channel transmission to the UE based at least on part on a modulation order and target code rate that are indicated by the first transmission parameter table at an entry associated with the parameter index value.

In some examples of the method, apparatuses, and non-transitory computer-readable medium described herein, the parameter index value includes a first subset of bits and a second subset of bits, where the first subset of bits indicates a first type of transmission parameter table, and the second subset of bits that provide the parameter index value. In some examples of the method, apparatuses, and non-transitory computer-readable medium described herein, the second subset of bits include a number of bits that are based on a size of the first transmission parameter table. In some examples of the method, apparatuses, and non-transitory computer-readable medium described herein, the first transmission parameter table is selected based on a configuration of one or more higher modulation order transmission parameter tables.

In some examples of the method, apparatuses, and non-transitory computer-readable medium described herein, the configuration information includes RRC configuration information for an PDSCH configuration. In some examples of the method, apparatuses, and non-transitory computer-readable medium described herein, the configuration information further includes RRC configuration information for a SPS configuration.

In some examples of the method, apparatuses, and non-transitory computer-readable medium described herein, the control signaling indicates the first transmission parameter table based on a set of rules and one or more of a higher layer parameter that configures one or more higher modulation order transmission parameter tables, a DCI format, whether the UE is configured with one or more types of RNTIs, or any combinations thereof. In some examples of the method, apparatuses, and non-transitory computer-readable medium described herein, the one or more higher modulation order transmission parameter tables include a combined transmission parameter table in which 1024QAM and 4096QAM modulation order parameters are combined into a single high SE table.

In some examples of the method, apparatuses, and non-transitory computer-readable medium described herein, the selecting the first transmission parameter table is based on a reference signal density indicated by the reference signal configuration provided to the UE. In some examples of the method, apparatuses, and non-transitory computer-readable medium described herein, a higher order transmission parameter table is selected as the first transmission parameter table based on a PTRS configuration that provides a PTRS density that exceeds a threshold value. In some examples of the method, apparatuses, and non-transitory computer-readable medium described herein, the first transmission parameter table indicates a modulation order and code rate for uplink shared channel transmissions from the UE that use a modulation order of 256QAM and 1024QAM. In some examples of the method, apparatuses, and non-transitory computer-readable medium described herein, a set of multiple transmission parameter tables are configured separately for different frequency ranges used for communications between the UE and the base station, for different spectral efficiencies used for communications between the UE and the base station, or any combinations thereof.

DETAILED DESCRIPTION

Figure 1:
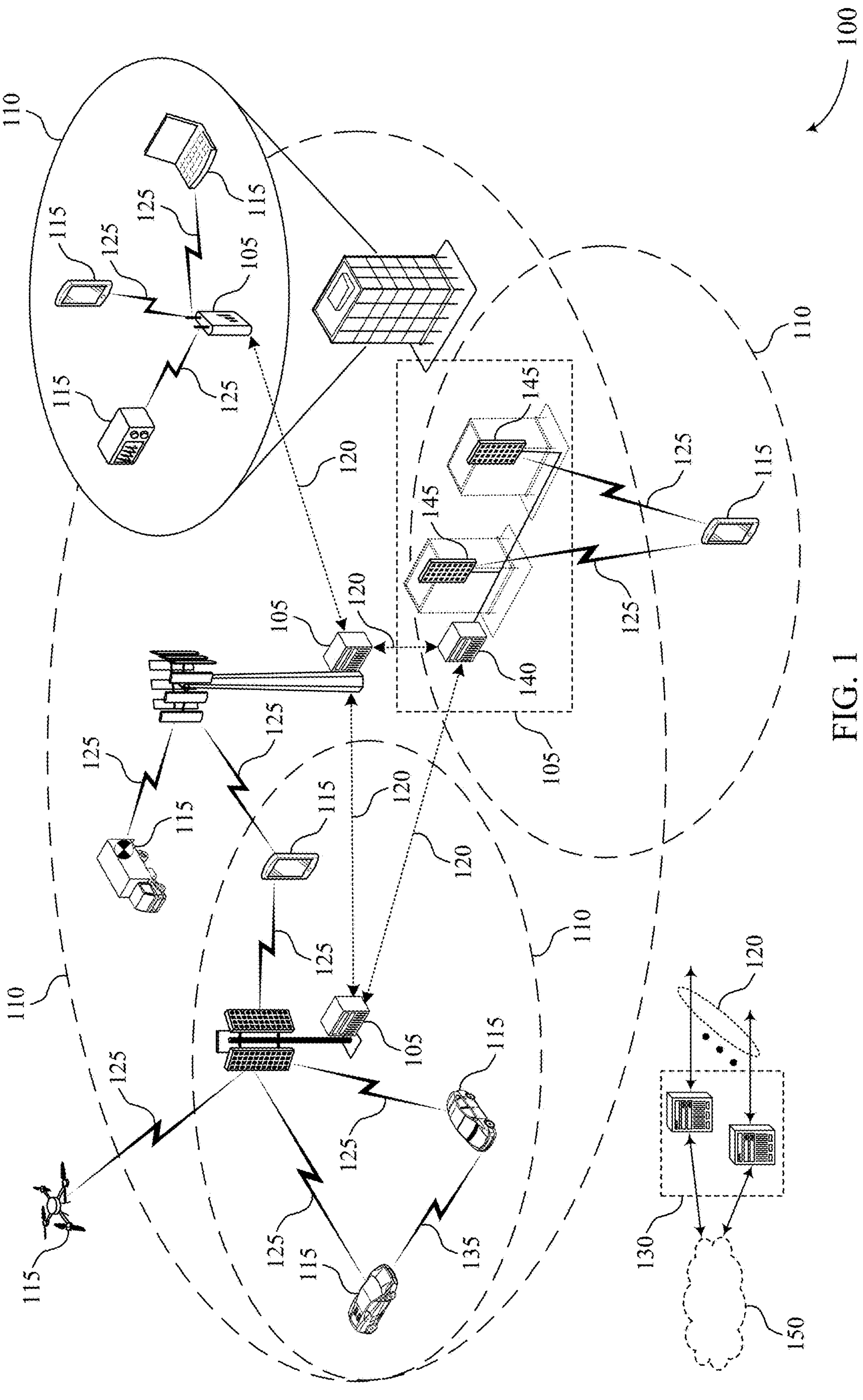
FIG. 1 illustrates an example of a wireless communications system that supports configuration and signaling for different modulation orders in accordance with aspects of the present disclosure.

In some wireless communications systems, multiple different modulation orders may be available for communications between a user equipment (UE) and a base station. A UE and base station may communicate according to a modulation and coding scheme (MCS) in which a modulation order and code rate for communications is set based on channel conditions between the UE and base station. In some cases a UE may measure channel conditions and transmit a measurement report to the base station, which may set the MCS based at least in part on the channel conditions. For example, a UE may measure one or more reference signals transmitted by a base station (e.g., a channel state information reference signal (CSI-RS)), and transmit a measurement report to the base station that indicates measured channel conditions. The measurement report may include, in some cases, channel quality indicator (CQI) that is an index value to an established CQI table that maps CQI index values to different combinations of modulation orders, code rates, and spectral efficiency that may be supported at the UE. Based on the measurement report, the base station may allocate resources to a UE for communications using a modulation order and code rate that is indicated as an index value into an MCS table that maps MCS index values different combinations of modulation orders, code rates, and spectral efficiency.

In some wireless communications systems, UEs may be deployed that have relatively advanced receiver designs that are capable of supporting relatively high modulation orders. For example, some systems may support modulation orders ranging from quadrature phase shift keying (QPSK) through 64 quadrature amplitude multiplexing (QAM), other more advanced systems may support modulation orders up to 1024-QAM, and in some even more advanced systems modulation orders of up to 4096-QAM (or higher). In systems supporting higher modulation orders, signaling of CQI and MCS values may provide information for transmission parameters for a relatively large range of modulation orders. However, simply increasing table sizes for various different combinations of supported modulation orders may result in increased overhead, which is undesirable. In some systems, modified tables have been proposed in which various lower modulation order entries may be removed to allow for indication of higher modulation order entries without increasing a number of bits used to signal the index value into the particular table, where signaling of the index values uses a fixed number of bits in uplink control information (UCI) and downlink control information (DCI). However, such techniques decrease options for different combinations of modulation orders and code rates, which may reduce overall network efficiency.

In accordance with various aspects as discussed herein, described techniques provide for configuration of one or more parameter tables that provide mapping between a MCS index and a modulation order and code rate, with efficient switching between multiple tables. In some cases, a base station may provide configuration information to a UE that indicates one or more tables (e.g., multiple MCS or CQI tables) that are configured for communications. In some cases, the one or more tables are configured based at least in part on a frequency range for communications, a reference signal configuration, or any combinations thereof. The base station may transmit control information to the UE that indicates a parameter index value that may be used to determine a modulation order and code rate for communications. In some cases, the control information may include a first subset of bits that indicate the parameter index value and a second subset of bits that indicate a first table of two or more configured tables is to be used to determine transmission parameters including modulation order and code rate. In some cases, a particular table may be selected based on a configuration that is provided in radio resource control (RRC) signaling or in a medium access control (MAC) control element (CE) that indicates one or multiple tables. Thus, control information overhead associated with CQI and MCS indications may not need to be increased or increased by a relatively small amount, while allowing relatively good resolution for modulation order and code rate combinations that may provide for enhanced communications efficiency.

Aspects of the disclosure are initially described in the context of wireless communications systems. Aspects of the disclosure are further illustrated by and described with reference to process flows, apparatus diagrams, system diagrams, and flowcharts that relate to configuration and signaling for different modulation orders.

FIG. 1 illustrates an example of a wireless communications system 100 that supports configuration and signaling for different modulation orders in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the code rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may be capable of supporting relatively high modulation orders, such as 1024-QAM or 4096-QAM. In some cases, to support signaling of transmission parameters for higher modulation orders, a base station 105 may configure one or more tables with different numbers of table entries that provide mapping between a CQI or MCS index and a modulation order and code rate. In some cases, a base station 105 may provide configuration information to a UE 115 that indicates a table size for one or more CQI or MCS tables, and a number of bits that are to be transmitted in control information to indicate an index value for the CQI and/or MCS tables (e.g., an MCS indication field size, a CQI indication field size, or any combinations thereof). Additionally or alternatively, one or more modified tables may be configured by a base station 105 and indicated to a UE 115 for supporting higher modulation orders.

In some cases, wireless communications system 100 may support transmissions having relatively high modulation orders, such as 1024-QAM or 4096-QAM. A base station 105 may configure one or more parameter tables (e.g., MCS tables) that provide mapping between a MCS index and a modulation order and code rate. In some cases, the base station 105 may provide configuration information to a UE 115 that indicates the one or more tables, and switching between the tables may be performed based on one or more of control information provided to the UE 115 (e.g., downlink control information (DCI) that indicates a particular table), a frequency range of communications (e.g., communications in frequency range one (FR1) use a first MCS table and communications in frequency range two (FR2) use a second MCS table), a reference signal configuration (e.g., a phase tracking reference signal (PTRS) configuration with a PTRS density above a threshold value may use a first MCS table and a second MCS table may otherwise be used), or any combinations thereof. The base station 105 may transmit control information to the UE 115 that indicates a parameter index value that may be used to determine a modulation order and code rate for communications. In some cases, the control information may include a first subset of bits that indicate the parameter index value and a second subset of bits that indicate a first table of two or more configured tables is to be used to determine transmission parameters including modulation order and code rate.

Figure 2:
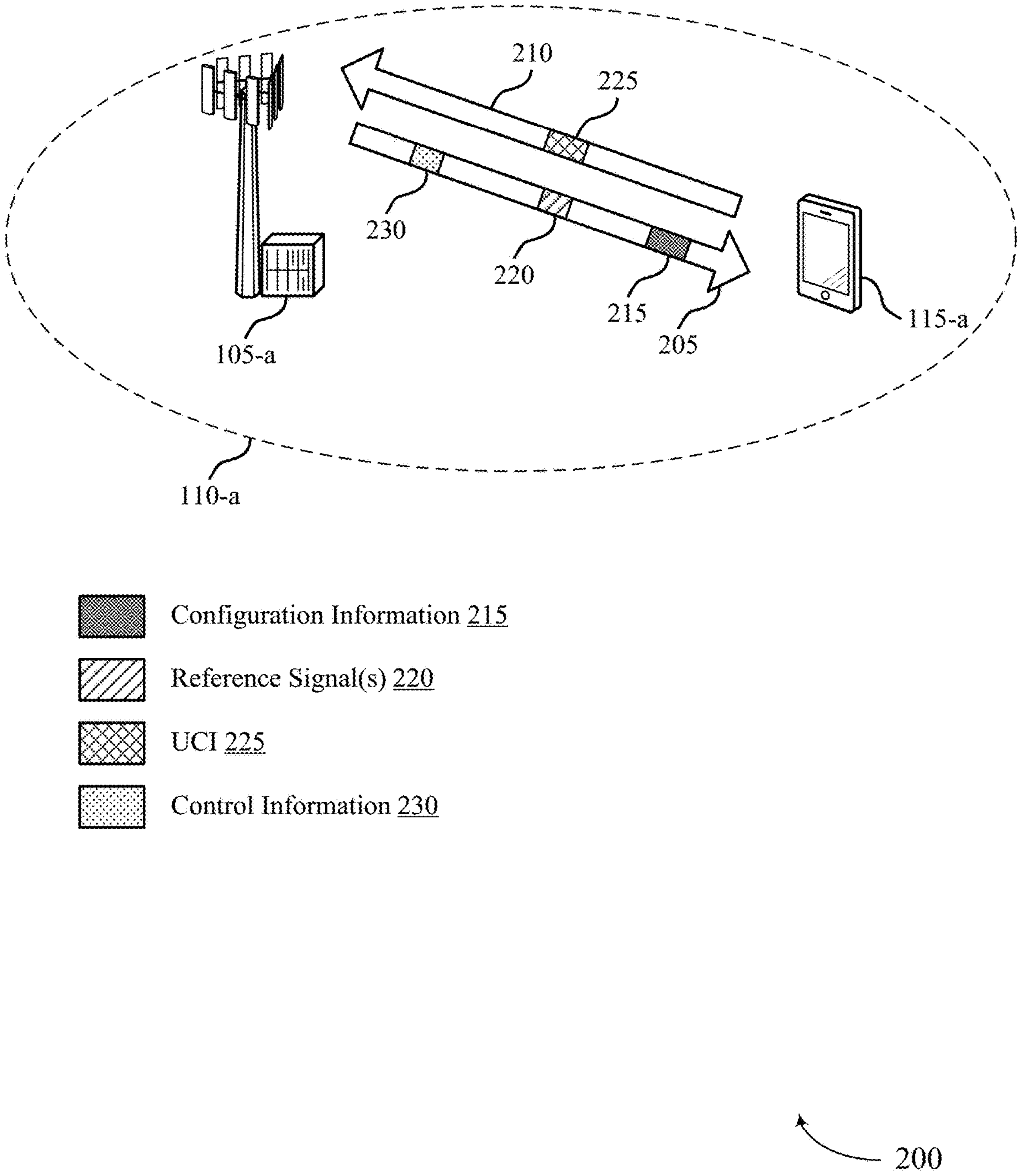
FIG. 2 illustrates an example of a wireless communications system that supports configuration and signaling for different modulation orders in accordance with aspects of the present disclosure.

FIG. 2 illustrates an example of a wireless communications system 200 that supports configuration and signaling for different modulation orders in accordance with aspects of the present disclosure. In some examples, the wireless communications system 200 may implement aspects of wireless communications system 100. Wireless communications system 200 may include UE 115-*a* that may be an example of a UE 115 as described with respect to FIG. 1, and base station 105-*a* that may be an example of a base station 105 as described with respect to FIG. 1. The base station 105-*a* may serve one or more UEs 115, including UE 115-*a*, within coverage area 110-*a*. The base station 105-*a* and UE 115-*a* in this example may exchange downlink and uplink communications using downlink carrier 205 and uplink carrier 210 (which may be a same carrier or different carriers).

As discussed herein, in some cases, UE 115-*a* may be capable of supporting relatively high modulation orders, such as 1024-QAM or 4096-QAM. In some cases, to support signaling of transmission parameters for higher modulation orders, base station 105-*a* may configure one or more MCS tables that provide mapping between a MCS index and a modulation order, code rate, and spectral efficiency. Similarly, multiple CQI tables may be configured. For example, the base station 105-*a* may provide configuration information 215 to UE 115-*a* (e.g., in RRC signaling) that indicates multiple different tables are available for MCS. Based on the configuration information 215, the UE 115-*a* may measure one or more reference signals 220 transmitted by the base station 105-*a* and provide a measurement report that is transmitted in UCI 225 (e.g., the measurement report may include CQI that indicates a supported modulation order and code rate). Based on the measurement report, the base station 105-*a* may determine a MCS for communications with the UE 115-*a*, and may transmit control information 230 (e.g., DCI) that provides an MCS index for one of the configured MCS table.

In some cases, the UE 115-*a* may support 4096-QAM, and the configuration information may indicate that a 4096-QAM table is to be used for indicating MCS index values, where a number of bits that are to be transmitted in control information to indicate the index values is based on a size of the configured table. In some cases, one or more higher modulation order MCS tables may be specified and one of such tables selected by the base station 105-*a* and indicated to the UE 115-*a* in the configuration information.

In some cases, the MCS indication field size in the control information 230 may include a number of bits that is sufficient to provide an MCS index into a MCS table with a relatively large number of entries (e.g., the base station 105-*a* may configure a MCS table that is indexed by more than five bits in an MCS indication field in the control information 230). In some cases, in order to maintain a same number of bits for MCS indication across multiple different MCS tables, a new MCS table for higher spectral efficiency (SE) may be configured as a 'Higher SE' table that contains only higher order QAM (e.g., 16-QAM or greater, or 64-QAM or greater modulation orders) with a same number of bits as with existing MCS tables (e.g., 32 entry tables that are indexed by a 5-bit MCS indication field in the control information 230). In other cases, one or more additional bits may be added to an MCS indication field to indicate one table of multiple available tables are to be used in conjunction with an MCS indicator. For example, a parameter index value in the control information 230 may include a first subset of bits (e.g., one bit) that indicates a MCS table to be used, and a second subset of bits (e.g., 5 bits) that provide the MCS index value for the selected table. In cases where the first subset of bits includes one bit, a first value of the bitfield may indicate to use a lower modulation order MCS table (e.g., a 5-bit MCS table with 32 entries that span from QPSK through 64-QAM modulation orders), and a second value of the bitfield may indicate to use a higher modulation order MCS table (e.g., a 5-bit MCS table with 32 entries that span from 64-QAM through 4096-QAM modulation orders). In other cases, a higher modulation order MCS table (e.g., a 4096-QAM MCS table) may be used with certain control information 230 formats. For example, a higher modulation order table may be used with DCI format 1_1 and 1_2 that have a cyclic redundancy check (CRC) scrambled by a radio network temporary identified (RNTI) associated with the UE 115-*a* (e.g., a cell RNTI (C-RNTI) or configured scheduling RNTI (CS-RNTI)).

In some cases, the base station 105-*a* may provide an indication to the UE 115-*a* to switch between different MCS tables for different communications. In some cases, a RRC parameter may be provided that is used to indicate whether a particular MCS table is to be used by the UE 115-*a* (e.g., an RRC parameter of mcsTable-r18). In such cases, separate RRC signaling may be used for each of two control information 230 formats (e.g., DCI format 1_1 and 1_2). In some cases, the RRC signaling may be provided in a physical downlink shared channel (PDSCH) configuration. In some cases, the RRC signaling may be provided in PDSCH configuration, in a semi-persistent scheduling (SPS) configuration, or combinations thereof. In some cases, the configured RRC parameter(s) may be signaled to the UE 115-*a* in the control information 230, and the UE 115-*a* may determine the MCS table that applies to an associated resource allocation using a set of rules, examples of which are discussed below.

In a first example, a table may be tied to a certain PTRS configuration, and a high density PTRS (e.g., a PTRS density greater than a threshold value, such as a number of symbols between PTRS instances being two or less) means that a higher modulation order is to be configured, such as according to a set of rules for modulation order and target code rate determination. For example, modulation order and code rate determination as defined by 3GPP TS 38.214 may be provided as:

For the PDSCH scheduled by a PDCCH with DCI format 1_0, format 1_1 or format 1_2 with CRC scrambled by CRNTI, MCS-C-RNTI, TC-RNTI, CS-RNTI, SI-RNTI, RA-RNTI, MsgB-RNTI, or P-RNTI, or for the PDSCH scheduled without corresponding PDCCH transmissions using the higher-layer-provided PDSCH configuration SPSConfig, if the higher layer parameter mcs-TableForDCI-Format1-2-r16 (mcs-TableForDCI-Format1-2-r17/mcs-TableForDCI-Format1-2-r18) given by PDSCH-Config is set to 'qam256', and the PDSCH is scheduled by a PDCCH with DCI format 1_2 with CRC scrambled by C-RNTI—the UE shall use $I_{MCS}$ and Table 5.1.3.1-2 to determine the modulation order ($Q_m$) and Target code rate (R) used in the physical downlink shared channel.

elseif the UE is not configured with MCS-C-RNTI, the higher layer parameter mcs-TableForDCI-Format1-2-r16(mcs-TableForDCI-Format1-2-r17/mcs-TableForDCI-Format1-2-r18) given by PDSCH-Config is set to 'qam64LowSE', and the PDSCH is scheduled by a PDCCH with DCI format 1_2 scrambled by C-RNTI the UE shall use $I_{MCS}$ and Table 5.1.3.1-3 to determine the modulation order ($Q_m$) and Target code rate (R) used in the physical downlink shared channel.

[for 1024-QAM modulation] elseif the UE is not configured with MCS-C-RNTI, the higher layer parameter mcs-TableForDCI-Format1-2-r17 given by PDSCH-Config is set to qam1024, and the PDSCH is scheduled by a PDCCH with DCI format 1_2 scrambled by C-RNTI the UE shall use $I_{MCS}$ and 1024-QAM table to determine the modulation order ($Q_m$) and Target code rate (R) used in the physical downlink shared channel.

[for 4096-QAM modulation] elseif the UE is not configured with MCS-C-RNTI, the higher layer parameter mcs-TableForDCI-Format1-2-r18 given by PDSCH-Config is set to qam4096, and the PDSCH is scheduled by a PDCCH with DCI format 1_2 scrambled by C-RNTI the UE shall use $I_{MCS}$ and 4096-QAM table to determine the modulation order ($Q_m$) and Target code rate (R) used in the physical downlink shared channel.

elseif the higher layer parameter mcs-Table (or mcs-Table-r17 or mcs-Table-r18) given by PDSCH-Config is set to 'qam256', and the PDSCH is scheduled by a PDCCH with DCI format 1_1 with CRC scrambled by C-RNTI the UE shall use $I_{MCS}$ and Table 5.1.3.1-2 to determine the modulation order ($Q_m$) and Target code rate (R) used in the physical downlink shared channel.

elseif the UE is not configured with MCS-C-RNTI, the higher layer parameter mcs-Table (mcs-Table-r17/mcs-Table-r18) given by PDSCH-Config is set to 'qam64LowSE', and the PDSCH is scheduled by a PDCCH with a DCI format other than DCI format 1_2 in a UE-specific search space with CRC scrambled by C-RNTI the UE shall use $I_{MCS}$ and Table 5.1.3.1-3 to determine the modulation order ($Q_m$) and Target code rate (R) used in the physical downlink shared channel.

[for 1024-QAM modulation] elseif the UE is not configured with MCS-C-RNTI, the higher layer parameter mcs-Table-r17 (or mcs-Table-r18) given by PDSCH-Config is set to 'qam1024', and the PDSCH is scheduled by a PDCCH with a DCI format other than DCI format 1_2 in a UE-specific search space with CRC scrambled by C-RNTI the UE shall use $I_{MCS}$ and 1024QAM Table to determine the modulation order ($Q_m$) and Target code rate (R) used in the physical downlink shared channel.

[for 4096-QAM modulation] elseif the UE is not configured with MCS-C-RNTI, the higher layer parameter mcs-Table-r18 given by PDSCH-Config is set to 'qam4096', and the PDSCH is scheduled by a PDCCH with a DCI format other than DCI format 1_2 in a UE-specific search space with CRC scrambled by C-RNTI the UE shall use $I_{MCS}$ and 4096QAM Table to determine the modulation order ($Q_m$) and Target code rate (R) used in the physical downlink shared channel.

elseif the UE is configured with MCS-C-RNTI, and the PDSCH is scheduled by a PDCCH with CRC scrambled by MCS-C-RNTI the UE shall use $I_{MCS}$ and Table 5.1.3.1-3 to determine the modulation order ($Q_m$) and Target code rate (R) used in the physical downlink shared channel.

[for 1024-QAM modulation] elseif the UE is configured with MCS-C-RNTI2, and the PDSCH is scheduled by a PDCCH with CRC scrambled by MCS-C-RNTI2 the UE shall use $I_{MCS}$ and 1024-QAM Table to determine the modulation order ($Q_m$) and Target code rate (R) used in the physical downlink shared channel.

[for 4096-QAM modulation] elseif the UE is configured with MCS-C-RNTI3, and the PDSCH is scheduled by a PDCCH with CRC scrambled by MCS-C-RNTI3 the UE shall use $I_{MCS}$ and 4096-QAM Table to determine the modulation order ($Q_m$) and Target code rate (R) used in the physical downlink shared channel.

elseif the UE is not configured with the higher layer parameter mcs-Table (mcs-Table Rel-17/mcs-Table Rel-18) given by SPS-config, and the higher layer parameter mcs-TableForDCI-Format1-2-r16 (mcs- TableForDCI-Format1-2-r17/mcs-TableForDCI-Format1-2-r18) given by PDSCH-Config is set to 'qam256', if the PDSCH is scheduled by a PDCCH with DCI format 1_2 with CRC scrambled by CS-RNTI or if the PDSCH with SPS activated by DCI format 1_2 is scheduled without corresponding PDCCH transmission using SPS-Config, the UE shall use $I_{MCS}$ and Table 5.1.3.1-2 to determine the modulation order ($Q_m$) and Target code rate (R) used in the physical downlink shared channel.

[for 1024-QAM modulation] elseif the UE is not configured with the higher layer parameter mcs-Table Rel-17 (or mcs-Table Rel-18) given by SPS-config, and the higher layer parameter mcs-TableForDCI-Format1-2-r17 given by PDSCH-Config is set to qam1024 if the PDSCH is scheduled by a PDCCH with DCI format 1_2 with CRC scrambled by CS-RNTI or if the PDSCH with SPS activated by DCI format 1_2 is scheduled without corresponding PDCCH transmission using SPS-Config, the UE shall use $I_{MCS}$ and 1024-QAM table to determine the modulation order ($Q_m$) and Target code rate (R) used in the physical downlink shared channel.

[for 4096-QAM modulation] elseif the UE is not configured with the higher layer parameter mcs-Table Rel-18 given by SPS-config, and the higher layer parameter mcs-TableForDCI-Format1-2-r18 given by PDSCH-Config is set to qam4096 if the PDSCH is scheduled by a PDCCH with DCI format 1_2 with CRC scrambled by CS-RNTI or if the PDSCH with SPS activated by DCI format 1_2 is scheduled without corresponding PDCCH transmission using SPS-Config, the UE shall use $I_{MCS}$ and 4096-QAM table to determine the modulation order ($Q_m$) and Target code rate (R) used in the physical downlink shared channel.

elseif the UE is not configured with the higher layer parameter mcs-Table (or mcs-Table Rel-17 or mcs-Table Rel-18) given by SPS-Config, and the higher layer parameter mcs-Table (mcs-table rel17/mcs-table rel18) given by PDSCH-Config is set to 'qam256', if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and Table 5.1.3.1-2 to determine the modulation order ($Q_m$) and Target code rate (R) used in the physical downlink shared channel.

[for 1024-QAM modulation] elseif the UE is not configured with the higher layer parameter mcs-table re17 (or mcs-Table Rel-18) given by SPS-Config, and the higher layer parameter mcs-table rel17 given by PDSCH-Config is set to qam1024 if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and 1024QAM Table to determine the modulation order ($Q_m$) and Target code rate (R) used in the physical downlink shared channel.

[for 4096-QAM modulation] elseif the UE is not configured with the higher layer parameter mcs-table re18 given by SPS-Config, and the higher layer parameter mcs-table rel18 given by PDSCH-Config is set to qam4096 if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and 4096QAM Table to determine the modulation order ($Q_m$) and Target code rate (R) used in the physical downlink shared channel.

elseif the UE is configured with the higher layer parameter mcs-Table (mcs-Table Rel-17/mcs-Table Rel-18) given by SPS-Config set to 'qam64LowSE'-if the PDSCH is scheduled by a PDCCH with CRC scrambled by CS-RNTI or if the PDSCH is scheduled without corresponding PDCCH transmission using SPS-Config, the UE shall use $I_{MCS}$ and Table 5.1.3.1-3 to determine the modulation order ($Q_m$) and Target code rate (R) used in the physical downlink shared channel.

else the UE shall use $I_{MCS}$ and Table 5.1.3.1-1 to determine the modulation order ($Q_m$) and Target code rate (R) used in the physical downlink shared channel.

End

In a second example, modulation orders and code rates for both 1024-QAM and 4096-QAM modulation orders may be combined into a single table (e.g., that may also be tied to a high density PTRS configuration (e.g., a PTRS density greater than a threshold value), such as according to a set of rules for modulation order and target code rate determination. In such examples, modulation order and code rate determination as defined by 3GPP TS 38.214 may be provided as:

For the PDSCH scheduled by a PDCCH with DCI format 1_0, format 1_1 or format 1_2 with CRC scrambled by CRNTI, MCS-C-RNTI, TC-RNTI, CS-RNTI, SI-RNTI, RA-RNTI, MsgB-RNTI, or P-RNTI, or for the PDSCH scheduled without corresponding PDCCH transmissions using the higher-layer-provided PDSCH configuration SPSConfig, if the higher layer parameter mcs-TableForDCI-Format1-2-r16 (mcs-TableForDCI-Format1-2-r17/mcs-TableForDCI-Format1-2-r18) given by PDSCH-Config is set to 'qam256', and the PDSCH is scheduled by a PDCCH with DCI format 1_2 with CRC scrambled by C-RNTI the UE shall use $I_{MCS}$ and Table 5.1.3.1-2 to determine the modulation order ($Q_m$) and Target code rate (R) used in the physical downlink shared channel.

elseif the UE is not configured with MCS-C-RNTI, the higher layer parameter mcs-TableForDCI-Format1-2-r16 (mcs-TableForDCI-Format1-2-r17/mcs-TableForDCI-Format1-2-r18) given by PDSCH-Config is set to 'qam64LowSE', and the PDSCH is scheduled by a PDCCH with DCI format 1_2 scrambled by C-RNTI the UE shall use $I_{MCS}$ and Table 5.1.3.1-3 to determine the modulation order ($Q_m$) and Target code rate (R) used in the physical downlink shared channel.

[for 1024-QAM modulation] elseif the UE is not configured with MCS-C-RNTI, the higher layer parameter mcs-TableForDCI-Format1-2-r17 given by PDSCH-Config is set to qam1024, and the PDSCH is scheduled by a PDCCH with DCI format 1_2 scrambled by C-RNTI the UE shall use $I_{MCS}$ and HIGH_SE_TABLE to determine the modulation order ($Q_m$) and Target code rate (R) used in the physical downlink shared channel.

[for 4096-QAM modulation] elseif the UE is not configured with MCS-C-RNTI, the higher layer parameter mcs-TableForDCI-Format1-2-r18 given by PDSCH-Config is set to qam4096, and the PDSCH is scheduled by a PDCCH with DCI format 1_2 scrambled by C-RNTI the UE shall use $I_{MCS}$ and HIGH_SE_TABLE to determine the modulation order ($Q_m$) and Target code rate (R) used in the physical downlink shared channel.

elseif the higher layer parameter mcs-Table (mcs-Table-r17/mcs-Table-r18) given by PDSCH-Config is set to 'qam256', and the PDSCH is scheduled by a PDCCH with DCI format 1_1 with CRC scrambled by C-RNTI the UE shall use $I_{MCS}$ and Table 5.1.3.1-2 to determine the modulation order ($Q_m$) and Target code rate (R) used in the physical downlink shared channel.

elseif the UE is not configured with MCS-C-RNTI, the higher layer parameter mcs-Table (mcs-Table-r17/mcs-Table-r18) given by PDSCH-Config is set to 'qam64LowSE', and the PDSCH is scheduled by a PDCCH with a DCI format other than DCI format 1_2 in a UE-specific search space with CRC scrambled by C-RNTI the UE shall use $I_{MCS}$ and Table 5.1.3.1-3 to determine the modulation order ($Q_m$) and Target code rate (R) used in the physical downlink shared channel.

[for 1024-QAM modulation] elseif the UE is not configured with MCS-C-RNTI, the higher layer parameter mcs-Table-r17 (or mcs-Table Rel-18) given by PDSCH-Config is set to 'qam1024', and the PDSCH is scheduled by a PDCCH with a DCI format other than DCI format 1_2 in a UE-specific search space with CRC scrambled by C-RNTI the UE shall use $I_{MCS}$ and HIGH_SE_TABLE to determine the modulation order ($Q_m$) and Target code rate (R) used in the physical downlink shared channel.

[for 4096-QAM modulation] elseif the UE is not configured with MCS-C-RNTI, the higher layer parameter mcs-Table-r18 given by PDSCH-Config is set to 'qam4096', and the PDSCH is scheduled by a PDCCH with a DCI format other than DCI format 1_2 in a UE-specific search space with CRC scrambled by C-RNTI the UE shall use $I_{MCS}$ and HIGH_SE_TABLE to determine the modulation order ($Q_m$) and Target code rate (R) used in the physical downlink shared channel.

elseif the UE is configured with MCS-C-RNTI, and the PDSCH is scheduled by a PDCCH with CRC scrambled by MCS-C-RNTI the UE shall use $I_{MCS}$ and Table 5.1.3.1-3 to determine the modulation order ($Q_m$) and Target code rate (R) used in the physical downlink shared channel.

[for 1024-QAM and 4096-QAM modulation-combined table] elseif the UE is configured with MCS-C-RNTI2, and the PDSCH is scheduled by a PDCCH with CRC scrambled by MCS-C-RNTI2 the UE shall use $I_{MCS}$ and HIGH_SE_TABLE to determine the modulation order ($Q_m$) and Target code rate (R) used in the physical downlink shared channel.

elseif the UE is not configured with the higher layer parameter mcs-Table (mcs-Table Rel-17/mcs-Table Rel-18) given by SPS-config, and the higher layer parameter mcs-TableForDCI-Format1-2-r16 (mcs-TableForDCI-Format1-2-r17/mcs-TableForDCI-Format1-2-r18) given by PDSCH-Config is set to 'qam256', if the PDSCH is scheduled by a PDCCH with DCI format 1_2 with CRC scrambled by CS-RNTI or if the PDSCH with SPS activated by DCI format 1_2 is scheduled without corresponding PDCCH transmission using SPS-Config, the UE shall use $I_{MCS}$ and Table 5.1.3.1-2 to determine the modulation order ($Q_m$) and Target code rate (R) used in the physical downlink shared channel.

[for 1024-QAM modulation] elseif the UE is not configured with the higher layer parameter mcs-Table Rel-17 (mcs-Table Rel-18) given by SPS-config, and the higher layer parameter mcs-TableForDCI-Format1-2-r17 (mcs-TableForDCI-Format1-2-r18) given by PDSCH-Config is set to qam1024 if the PDSCH is scheduled by a PDCCH with DCI format 1_2 with CRC scrambled by CS-RNTI or if the PDSCH with SPS activated by DCI format 1_2 is scheduled without corresponding PDCCH transmission using SPS-Config, the UE shall use $I_{MCS}$ and HIGH_SE_TABLE to determine the modulation order ($Q_m$) and Target code rate (R) used in the physical downlink shared channel.

[for 4096-QAM modulation] elseif the UE is not configured with the higher layer parameter mcs-Table Rel-18 given by SPS-config, and the higher layer parameter mcs-TableForDCI-Format1-2-r18 given by PDSCH-Config is set to qam4096 if the PDSCH is scheduled by a PDCCH with DCI format 1_2 with CRC scrambled by CS-RNTI or if the PDSCH with SPS activated by DCI format 1_2 is scheduled without corresponding PDCCH transmission using SPS-Config, the UE shall use $I_{MCS}$ and HIGH_SE_TABLE to determine the modulation order ($Q_m$) and Target code rate (R) used in the physical downlink shared channel.

elseif the UE is not configured with the higher layer parameter mcs-Table (mcs-Table Rel-17/mcs-Table Rel-18) given by SPS-Config, and the higher layer parameter mcs-Table (mcs-table rel17/mcs-table rel18) given by PDSCH-Config is set to 'qam256', if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and Table 5.1.3.1-2 to determine the modulation order ($Q_m$) and Target code rate (R) used in the physical downlink shared channel.

[for 1024-QAM modulation] elseif the UE is not configured with the higher layer parameter mcs-table re17 (mcs-table re18) given by SPS-Config, and the higher layer parameter mcs-table rel17 (mcs-table re18) given by PDSCH-Config is set to qam1024 if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and HIGH_SE_TABLE to determine the modulation order ($Q_m$) and Target code rate (R) used in the physical downlink shared channel.

[for 4096-QAM modulation] elseif the UE is not configured with the higher layer parameter mcs-table re18 given by SPS-Config, and the higher layer parameter mcs-table rel18 given by PDSCH-Config is set to qam4096 if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and HIGH_SE_TABLE to determine the modulation order ($Q_m$) and Target code rate (R) used in the physical downlink shared channel.

elseif the UE is configured with the higher layer parameter mcs-Table (or mcs-Table Rel-17 or mcs-Table Rel-18) given by SPS-Config set to 'qam64LowSE'-if the PDSCH is scheduled by a PDCCH with CRC scrambled by CS-RNTI or if the PDSCH is scheduled without corresponding PDCCH transmission using SPS-Config, the UE shall use $I_{MCS}$ and Table 5.1.3.1-3 to determine the modulation order ($Q_m$) and Target code rate (R) used in the physical downlink shared channel.

else the UE shall use $I_{MCS}$ and Table 5.1.3.1-1 to determine the modulation order ($Q_m$) and Target code rate (R) used in the physical downlink shared channel.

End

In each of these examples, Table 5.1.3.1-1, Table 5.1.3.1-2, and Table 5.1.3.1-3, correspond to MCS index tables 1 through 3 for PDSCH as defined in 3GPP TS 38.214. Further, HIGH SE table may be a MCS table that is configured with higher modulation orders (e.g., 1024-QAM and 4096-QAM) and higher SEs.

While various examples discussed herein are with reference to downlink transmissions from the base station 105-*a* to the UE 115-*a*, higher modulation orders may be used in some cases, for uplink communications as well. In some cases, base station 105-*a* may configure the UE 115-*a* for higher order modulation (e.g., 256-QAM and 1024-QAM) for UL-PUSCH communications. In such cases, one or more higher modulation order tables may be configured and selected using techniques as discussed for higher modulation order downlink communications.

In some cases, as discussed herein, a reference signal configuration may be used, alone or in combination with other items, to determine a table to use for MCS index signaling. For example, when the UE 115-*a* is configured to use PTRS, this may be is an indication of sensitivity to phase error, which may be used as implicit indication of the use of higher QAM modulation at high PTRS density (e.g., based on a number of symbols between PTRS instances). In some cases, while configuring the PTRS in RRC, a certain configuration could be associated with the use of certain QAM table when using certain density or pattern. Additionally or alternatively, based on the property that phase noise may increase at higher frequency ranges and that using lower SE might be better for such cases, the base station 105-*a* and UE 115-*a* may use different MCS tables for different frequency ranges. For example, the RRC parameters of tables may be provided for legacy tables for 64QAM, 64QAM Low SE, 256QAM, and one or more new RRC parameters may be provided for legacy tables in addition to 1024QAM and 4096QAM tables. In some cases, a parameter for a new table plus a tag for FR type (e.g., FR1, FR2, FR2x, etc.) may be provided such as, for example, 64QAM_FR1, 64QAM_FR2, 64QAM_SE_FR1, 64QAM_SE_FR2, and the like. Such techniques may allow for configuration of multiple tables and for selection of a particular table based on the corresponding channel conditions and supportable modulation orders. Thus, efficiency and reliability for communications may be enhanced, data rates enhanced, and an enhanced user experience may be provided.

Figure 3:
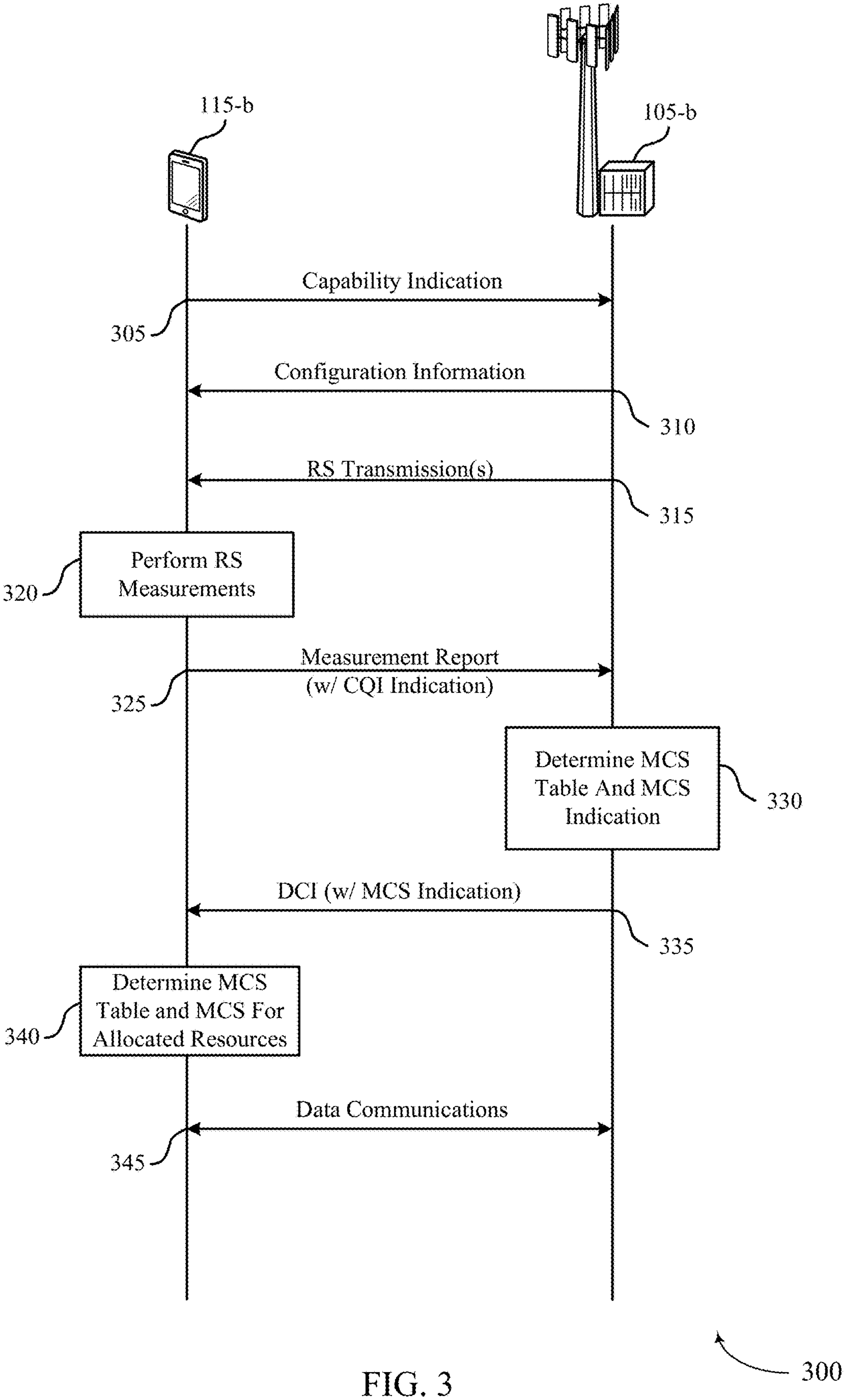
FIGS. 3 and 4 illustrate examples of process flows that support configuration and signaling for different modulation orders in accordance with aspects of the present disclosure.

FIG. 3 illustrates an example of a process flow 300 that supports configuration and signaling for different modulation orders in accordance with aspects of the present disclosure. In some examples, the process flow 300 may implement aspects of a wireless communications systems 100 or 200, as described with reference to FIGS. 1 and 2. The process flow 300 may include a UE 115-*b* and a base station 105-*b* which may be examples of the corresponding devices described herein. Alternative examples of the following may be implemented where some processes are performed in a different order than described or not performed at all. In some implementations, processes may include additional features not mentioned below, or further processes may be added.

At 305, the UE 115-*b* may transmit a capability indication to the base station 105-*b*. In some cases, the capability indication may indicate that the UE 115-*b* has a capability to support higher modulation orders, such as 1024-QAM and 4096-QAM. In some cases, the capability indication may be provided along with other UE 115-*b* capabilities in RRC signaling, as part of a connection establishment between the UE 115-*b* and base station 105-*b*.

At 310, the base station 105-*b* may transmit configuration information, which may be received at the UE 115-*b*. In some cases, the configuration information may include an indication that higher modulation orders are configured for communications between the UE 115-*b* and the base station 105-*b*. In some cases, the configuration information may indicate multiple MCS tables for transmission parameter tables, with table selection determined in accordance with various techniques as discussed herein.

At 315, the base station 105-*b* may transmit one or more reference signals (e.g., one or more CSI-RSs). At 320, the UE 115-*b* may receive the one or more reference signals and perform reference signal measurements. For example, the UE 115-*b* may perform CSI-RS measurements to determine one or more metrics associated with a channel quality between the base station 105-*b* and the UE 115-*b* (e.g., reference signal received power (RSRP), reference signal received quality (RSRQ), signal to noise ratio (SNR), signal to interference and noise ratio (SINR), signal-to-noise plus distortion ratio (SNDR), and the like).

At 325, the UE 115-*b* may transmit a measurement report to the base station 105-*b*, which may include a CQI indication that corresponds to a determined CQI index value. At 330, the base station 105-*b* may determine a MCS table and MCS index value from the multiple configured MCS tables for communications with the UE 115-*b*. In some cases, the MCS may be determined based on the measurement report from the UE 115-*b*, an amount of data to be transmitted to the UE 115-*b*, a frequency range for communications, a PTRS density, power constraints at the UE 115-*b* or base station 105-*b*, or any combinations thereof. At 335, the base station 105-*b* may transmit DCI to the UE 115-*b* with an indication of the determined MCS. In some cases, the DCI may include an indication of an MCS table to use, along with the MCS index indication (e.g., in different subsets of bits within the DCI).

At 340, the UE 115-*b* may determine the MCS table and MCS for communications using resources associated with the DCI. In some cases, the MCS table may be determined according to techniques as discussed herein, and the MCS index value provided in the DCI may be used to identify a modulation order and code rate for the communications with the base station 105-*a*. At 345, the UE 115-*b* and base station 105-*b* may then exchange communications based on resource allocations and the modulation order and code rate that are indicated by the MCS indication provided in the DCI.

Figure 4:
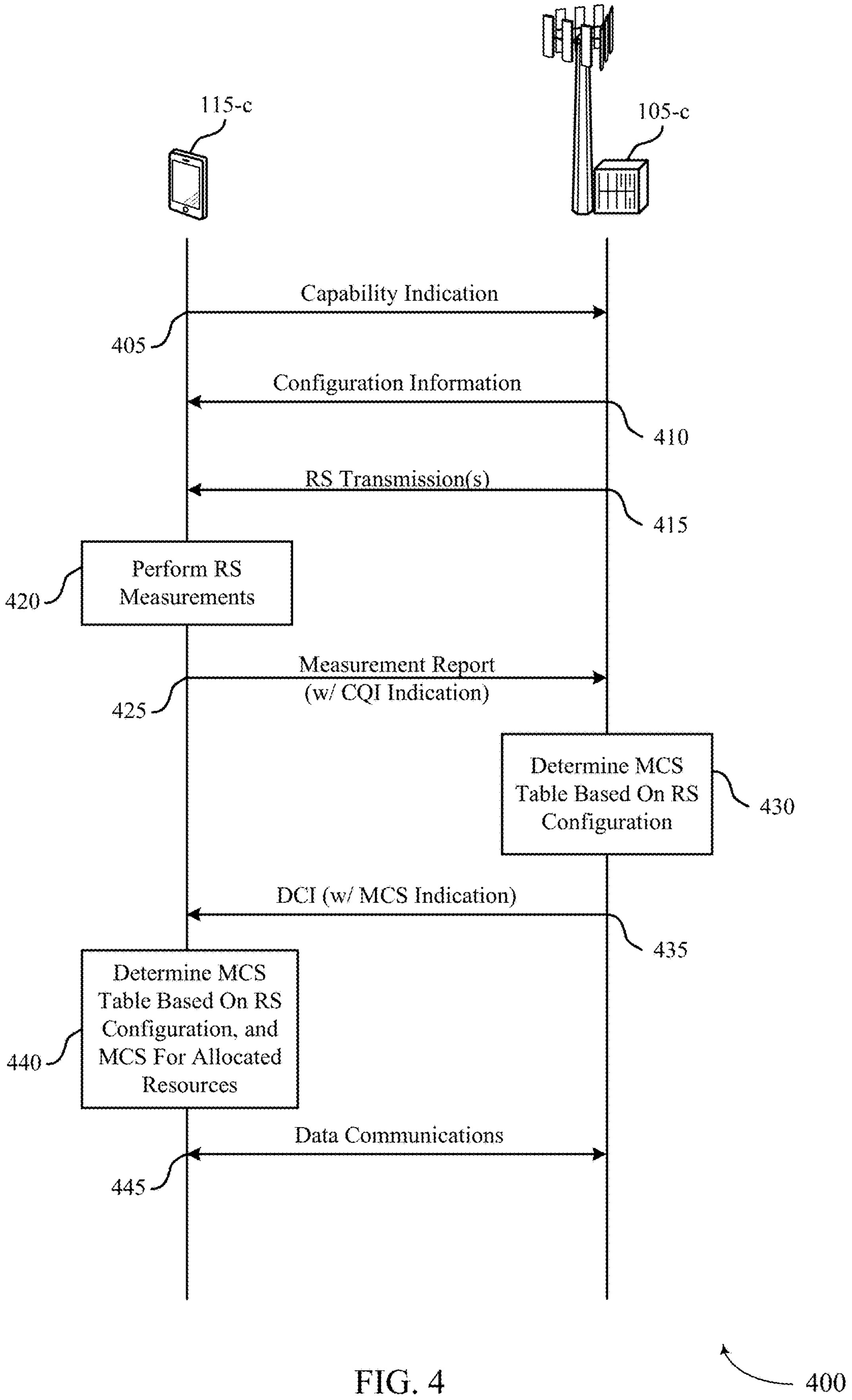

FIG. 4 illustrates an example of a process flow 400 that supports configuration and signaling for different modulation orders in accordance with aspects of the present disclosure.

In some examples, the process flow 300 may implement aspects of a wireless communications systems 100 or 200, as described with reference to FIGS. 1 and 2. The process flow 400 may include a UE 115-*c* and a base station 105-*c* which may be examples of the corresponding devices described herein. Alternative examples of the following may be implemented where some processes are performed in a different order than described or not performed at all. In some implementations, processes may include additional features not mentioned below, or further processes may be added.

At 405, the UE 115-*c* may transmit a capability indication to the base station 105-*c*. In some cases, the capability indication may indicate that the UE 115-*c* has a capability to support higher modulation orders, such as 1024-QAM and 4096-QAM. In some cases, the capability indication may be provided along with other UE 115-*c* capabilities in RRC signaling, as part of a connection establishment between the UE 115-*c* and base station 105-*c*.

At 410, the base station 105-*c* may transmit configuration information, which may be received at the UE 115-*c*. In some cases, the configuration information may include an indication that higher modulation orders are configured for communications between the UE 115-*c* and the base station 105-*c*. In some cases, the configuration information may indicate multiple MCS tables for transmission parameter tables, with table selection determined based at least in part on a reference signal configuration (e.g., different MCS tables are configured based on a PTRS density), in accordance with various techniques as discussed herein.

At 415, the base station 105-*c* may transmit one or more reference signals (e.g., one or more PTRSs or CSI-RSs). At 420, the UE 115-*c* may receive the one or more reference signals and perform reference signal measurements. For example, the UE 115-*c* may perform phase tracking measurements, CSI-RS measurements, or any combinations thereof. In some cases, the UE 115-*c* may determine one or more metrics associated with a channel quality between the base station 105-*c* and the UE 115-*c* (e.g., reference signal received power (RSRP), reference signal received quality (RSRQ), signal to noise ratio (SNR), signal to interference and noise ratio (SINR), signal-to-noise plus distortion ratio (SNDR), and the like).

At 425, the UE 115-*c* may transmit a measurement report to the base station 105-*c*. At 430, the base station 105-*c* may determine a MCS table and MCS index value from the multiple configured MCS tables for communications with the UE 115-*c*. In some cases, the MCS may be determined based on the measurement report from the UE 115-*c*, an amount of data to be transmitted to the UE 115-*c*, a frequency range for communications, a PTRS density, power constraints at the UE 115-*c* or base station 105-*c*, or any combinations thereof. At 435, the base station 105-*c* may transmit DCI to the UE 115-*c* with an indication of the determined MCS. In some cases, the PTRS density configured at the UE 115-*c* may be used to determine an MCS table to use.

At 440, the UE 115-*c* may determine the MCS table and MCS for communications using resources associated with the DCI. In some cases, the MCS table may be determined according to techniques as discussed herein, and the MCS index value provided in the DCI may be used to identify a modulation order and code rate for the communications with the base station 105-*a*. At 445, the UE 115-*c* and base station 105-*c* may then exchange communications based on resource allocations and the modulation order and code rate that are indicated by the MCS indication provided in the DCI.

Figure 5:
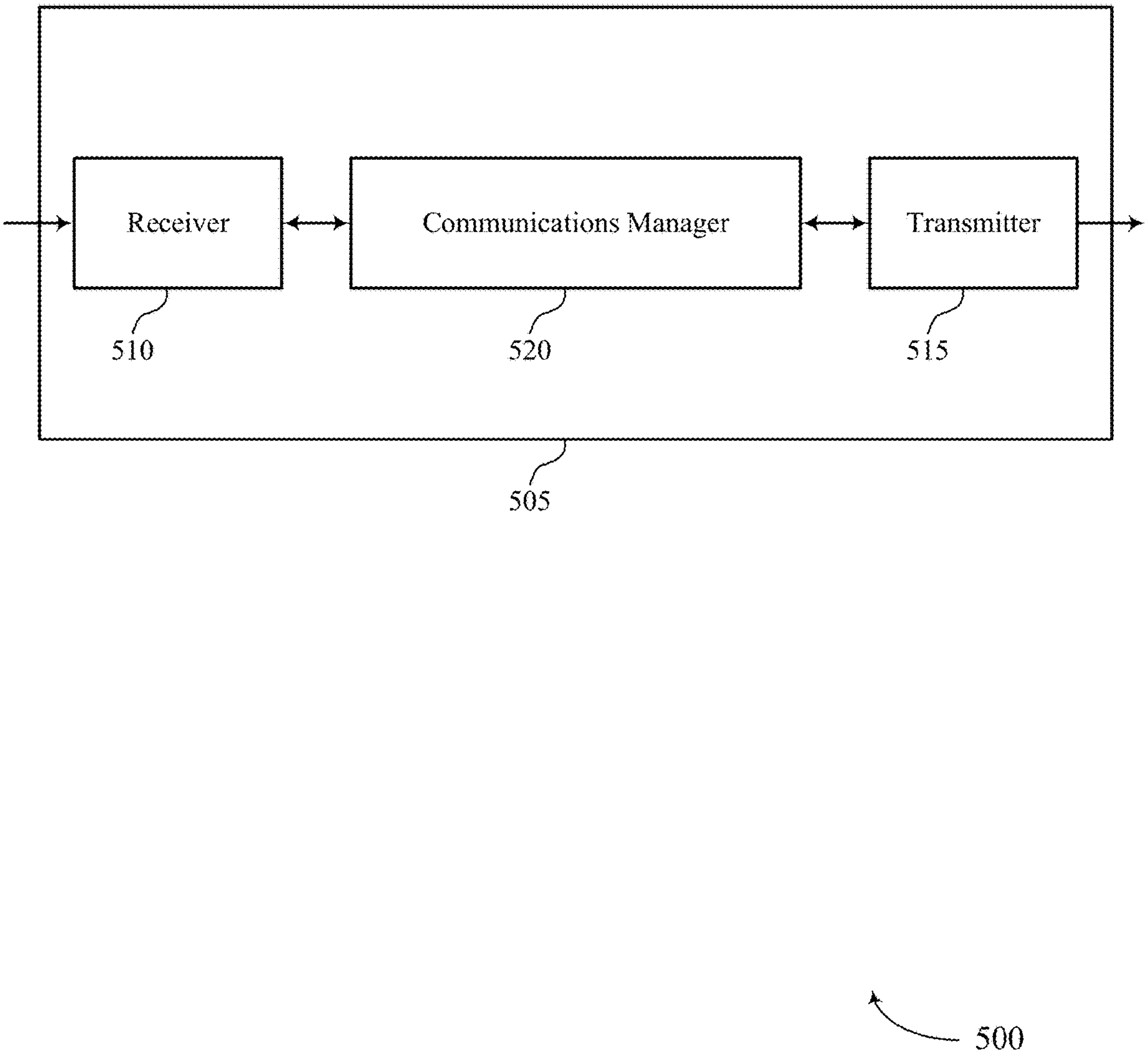
FIGS. 5 and 6 show block diagrams of devices that support configuration and signaling for different modulation orders in accordance with aspects of the present disclosure.

FIG. 5 shows a block diagram 500 of a device 505 that supports configuration and signaling for different modulation orders in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to configuration and signaling for different modulation orders). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to configuration and signaling for different modulation orders). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of configuration and signaling for different modulation orders as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, configuration information for two or more transmission parameter tables that provide one or more transmission parameters for two or more different modulation orders for communications between the base station and the UE. The communications manager 520 may be configured as or otherwise support a means for receiving, from the base station, control signaling that indicates a parameter index value for one of the two or more transmission parameter tables. The communications manager 520 may be configured as or otherwise support a means for selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof. The communications manager 520 may be configured as or otherwise support a means for receiving a shared channel transmission from the base station based at least on part on a modulation order and target code rate that are indicated by the first transmission parameter table at an entry associated with the parameter index value.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for transmission parameter table selection and signaling based on configured tables (e.g., MCS tables), which may allow for enhanced communications efficiency, reduced power consumption, more efficient utilization of communication resources, and enhanced reliability for wireless communications.

Figure 6:
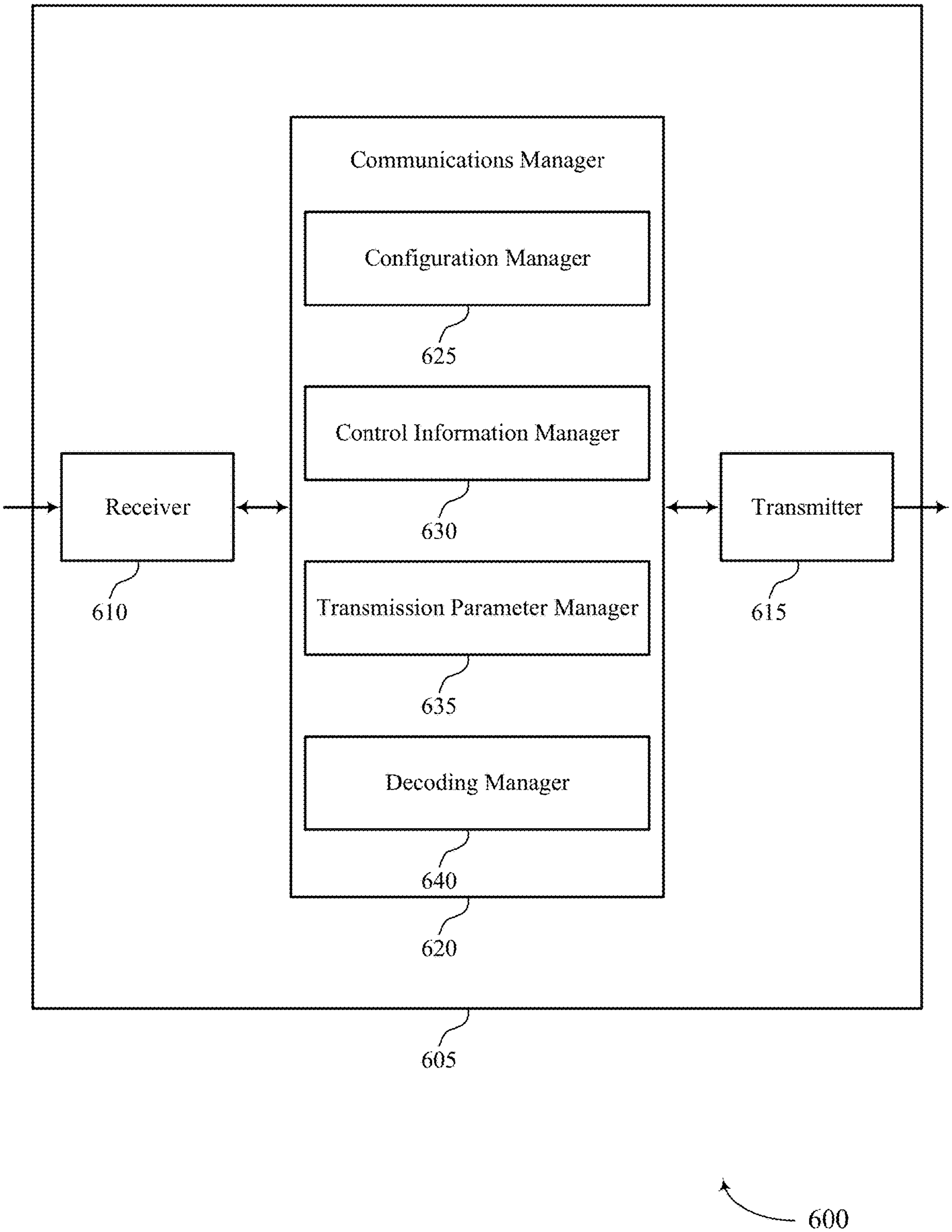

FIG. 6 shows a block diagram 600 of a device 605 that supports configuration and signaling for different modulation orders in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configuration and signaling for different modulation orders). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configuration and signaling for different modulation orders). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of configuration and signaling for different modulation orders as described herein. For example, the communications manager 620 may include a configuration manager 625, a control information manager 630, a transmission parameter manager 635, a decoding manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration manager 625 may be configured as or otherwise support a means for receiving, from a base station, configuration information for two or more transmission parameter tables that provide one or more transmission parameters for two or more different modulation orders for communications between the base station and the UE. The control information manager 630 may be configured as or otherwise support a means for receiving, from the base station, control signaling that indicates a parameter index value for one of the two or more transmission parameter tables. The transmission parameter manager 635 may be configured as or otherwise support a means for selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof. The decoding manager 640 may be configured as or otherwise support a means for receiving a shared channel transmission from the base station based at least on part on a modulation order and target code rate that are indicated by the first transmission parameter table at an entry associated with the parameter index value.

Figure 7:
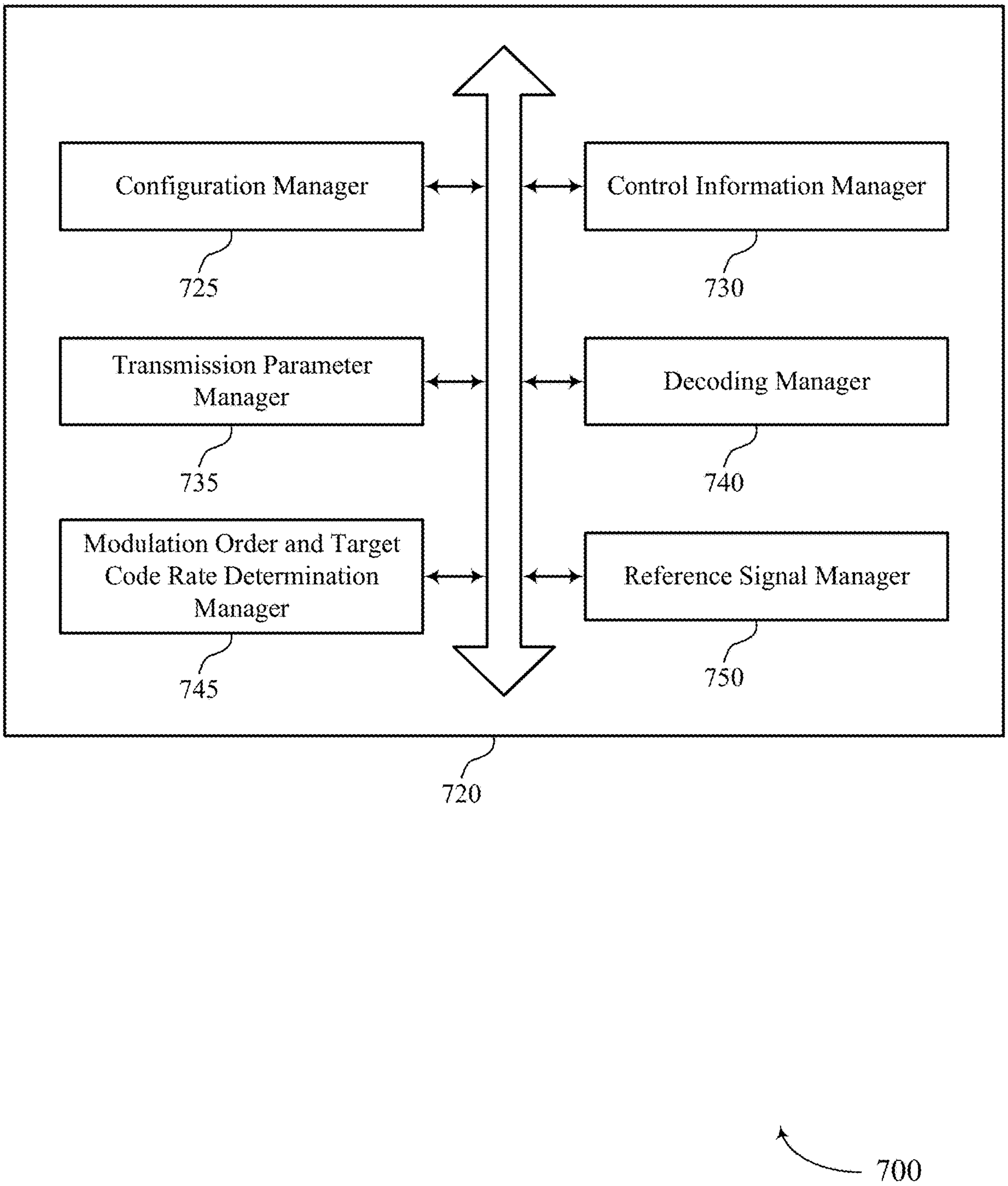
FIG. 7 shows a block diagram of a communications manager that supports configuration and signaling for different modulation orders in accordance with aspects of the present disclosure.

FIG. 7 shows a block diagram 700 of a communications manager 720 that supports configuration and signaling for different modulation orders in accordance with aspects of the present disclosure. The communications manager 720 may be an example of aspects of a communications manager 520, a communications manager 620, or both, as described herein. The communications manager 720, or various components thereof, may be an example of means for performing various aspects of configuration and signaling for different modulation orders as described herein. For example, the communications manager 720 may include a configuration manager 725, a control information manager 730, a transmission parameter manager 735, a decoding manager 740, a modulation order and target code rate determination manager 745, a reference signal manager 750, or any combination thereof. Each of these components may communicate, directly or indirectly, with one another (e.g., via one or more buses).

The communications manager 720 may support wireless communication at a UE in accordance with examples as disclosed herein. The configuration manager 725 may be configured as or otherwise support a means for receiving, from a base station, configuration information for two or more transmission parameter tables that provide one or more transmission parameters for two or more different modulation orders for communications between the base station and the UE. The control information manager 730 may be configured as or otherwise support a means for receiving, from the base station, control signaling that indicates a parameter index value for one of the two or more transmission parameter tables. The transmission parameter manager 735 may be configured as or otherwise support a means for selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof. The decoding manager 740 may be configured as or otherwise support a means for receiving a shared channel transmission from the base station based at least on part on a modulation order and target code rate that are indicated by the first transmission parameter table at an entry associated with the parameter index value.

In some examples, the parameter index value includes a first subset of bits and a second subset of bits, where the first subset of bits indicates a first type of transmission parameter table, and the second subset of bits that provide the parameter index value. In some examples, the second subset of bits include a number of bits that are based on a size of the first transmission parameter table. In some examples, the first transmission parameter table is selected based on a configuration of one or more higher modulation order transmission parameter tables. In some examples, the configuration information includes RRC configuration information for a PDSCH configuration. In some examples, the configuration information further includes RRC configuration information for a SPS configuration.

In some examples, the selecting the first transmission parameter table is based on a set of rules and one or more of a higher layer parameter that configures one or more higher modulation order transmission parameter tables, a DCI format, whether the UE is configured with one or more types of RNTIs, or any combinations thereof. In some examples, the one or more higher modulation order transmission parameter tables include a combined transmission parameter table in which 1024-QAM and 4096-QAM modulation order parameters are combined into a single high spectral efficiency (SE) table.

In some examples, the selecting the first transmission parameter table based on a reference signal density indicated by the reference signal configuration provided to the UE. In some examples, a higher order transmission parameter table is selected as the first transmission parameter table based on a PTRS configuration that provides a PTRS density that exceeds a threshold value. In some examples, the first transmission parameter table indicates a modulation order and code rate for uplink shared channel transmissions from the UE that use a modulation order of 256-QAM and 1024-QAM. In some examples, a set of multiple transmission parameter tables are configured separately for different frequency ranges used for communications between the UE and the base station, for different spectral efficiencies used for communications between the UE and the base station, or any combinations thereof.

Figure 8:
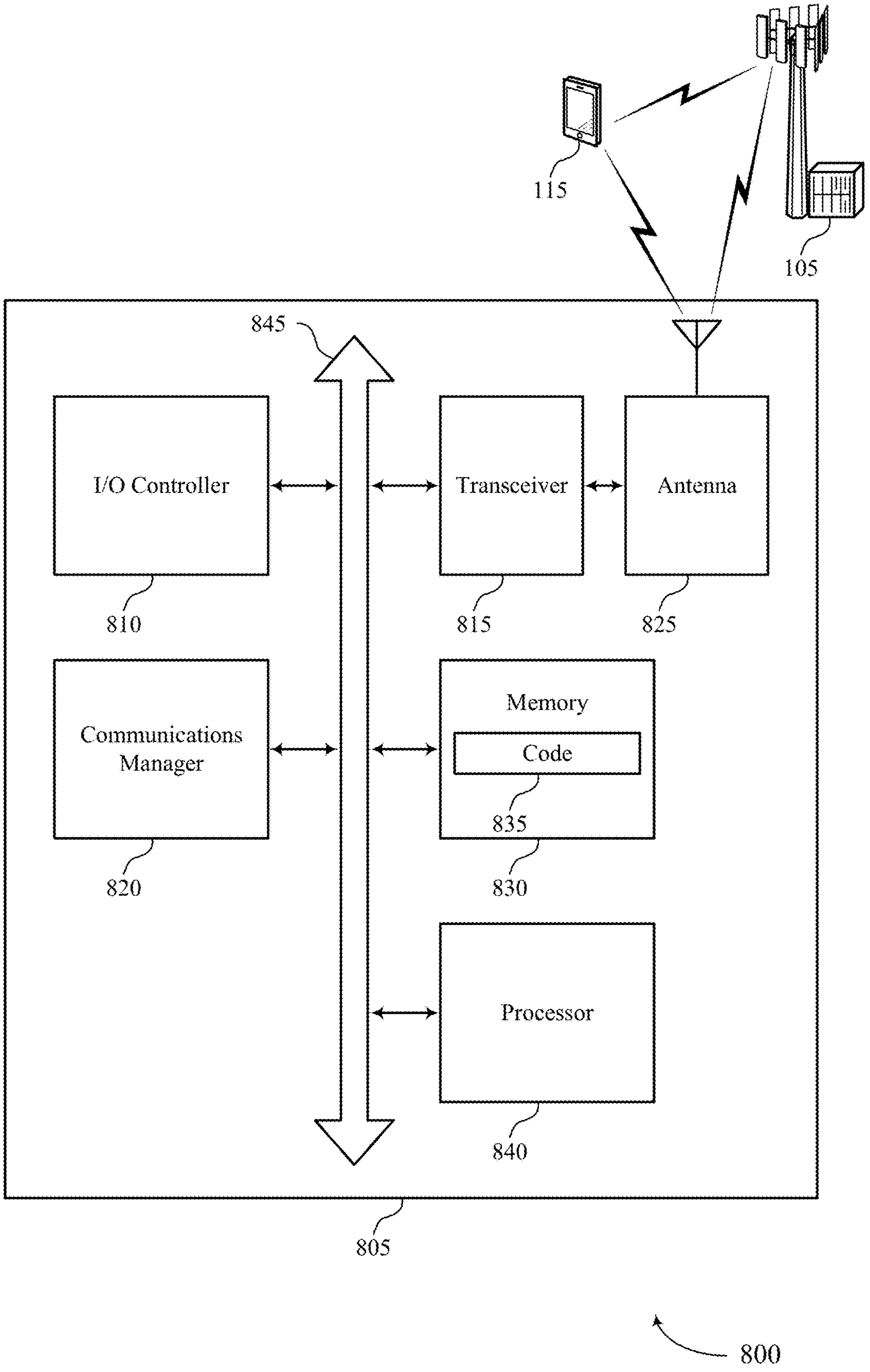
FIG. 8 shows a diagram of a system including a device that supports configuration and signaling for different modulation orders in accordance with aspects of the present disclosure.

FIG. 8 shows a diagram of a system 800 including a device 805 that supports configuration and signaling for different modulation orders in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting configuration and signaling for different modulation orders). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, configuration information for two or more transmission parameter tables that provide one or more transmission parameters for two or more different modulation orders for communications between the base station and the UE. The communications manager 820 may be configured as or otherwise support a means for receiving, from the base station, control signaling that indicates a parameter index value for one of the two or more transmission parameter tables. The communications manager 820 may be configured as or otherwise support a means for selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof. The communications manager 820 may be configured as or otherwise support a means for receiving a shared channel transmission from the base station based at least on part on a modulation order and target code rate that are indicated by the first transmission parameter table at an entry associated with the parameter index value.

By including or configuring the communications manager 820 in accordance with examples as described herein, the device 805 may support techniques for signaling of modulation order and code rates that are relatively finely tuned for channel conditions, which may provide improved communication reliability, reduced latency, improved user experience, reduced power consumption, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of configuration and signaling for different modulation orders as described herein, or the processor 840 and the memory 830 may be otherwise configured to perform or support such operations.

Figure 9:
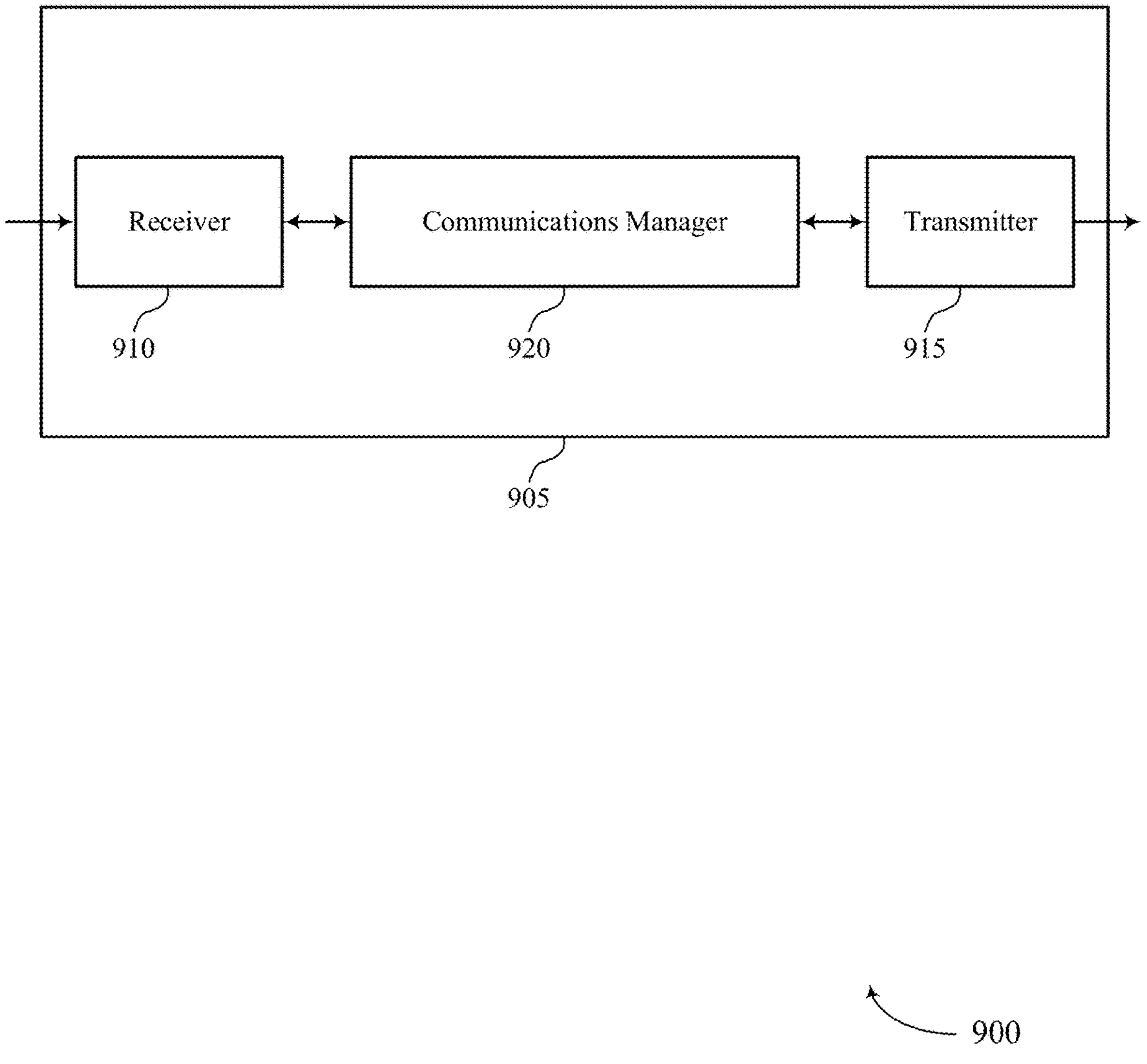
FIGS. 9 and 10 show block diagrams of devices that support configuration and signaling for different modulation orders in accordance with aspects of the present disclosure.

FIG. 9 shows a block diagram 900 of a device 905 that supports configuration and signaling for different modulation orders in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to configuration and signaling for different modulation orders). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to configuration and signaling for different modulation orders). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of configuration and signaling for different modulation orders as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, configuration information for two or more transmission parameter tables that provide one or more transmission parameters for two or more different modulation orders for communications between the base station and the UE. The communications manager 920 may be configured as or otherwise support a means for selecting a first transmission parameter table of the two or more transmission parameter tables and a parameter index value from the first transmission parameter table for communications with the UE. The communications manager 920 may be configured as or otherwise support a means for transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof. The communications manager 920 may be configured as or otherwise support a means for transmitting a shared channel transmission to the UE based at least on part on a modulation order and target code rate that are indicated by the first transmission parameter table at an entry associated with the parameter index value.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for signaling of modulation order and code rates that are relatively finely tuned for channel conditions, which may provide improved communication reliability, reduced latency, improved user experience, reduced power consumption, and more efficient utilization of communication resources.

Figure 10:
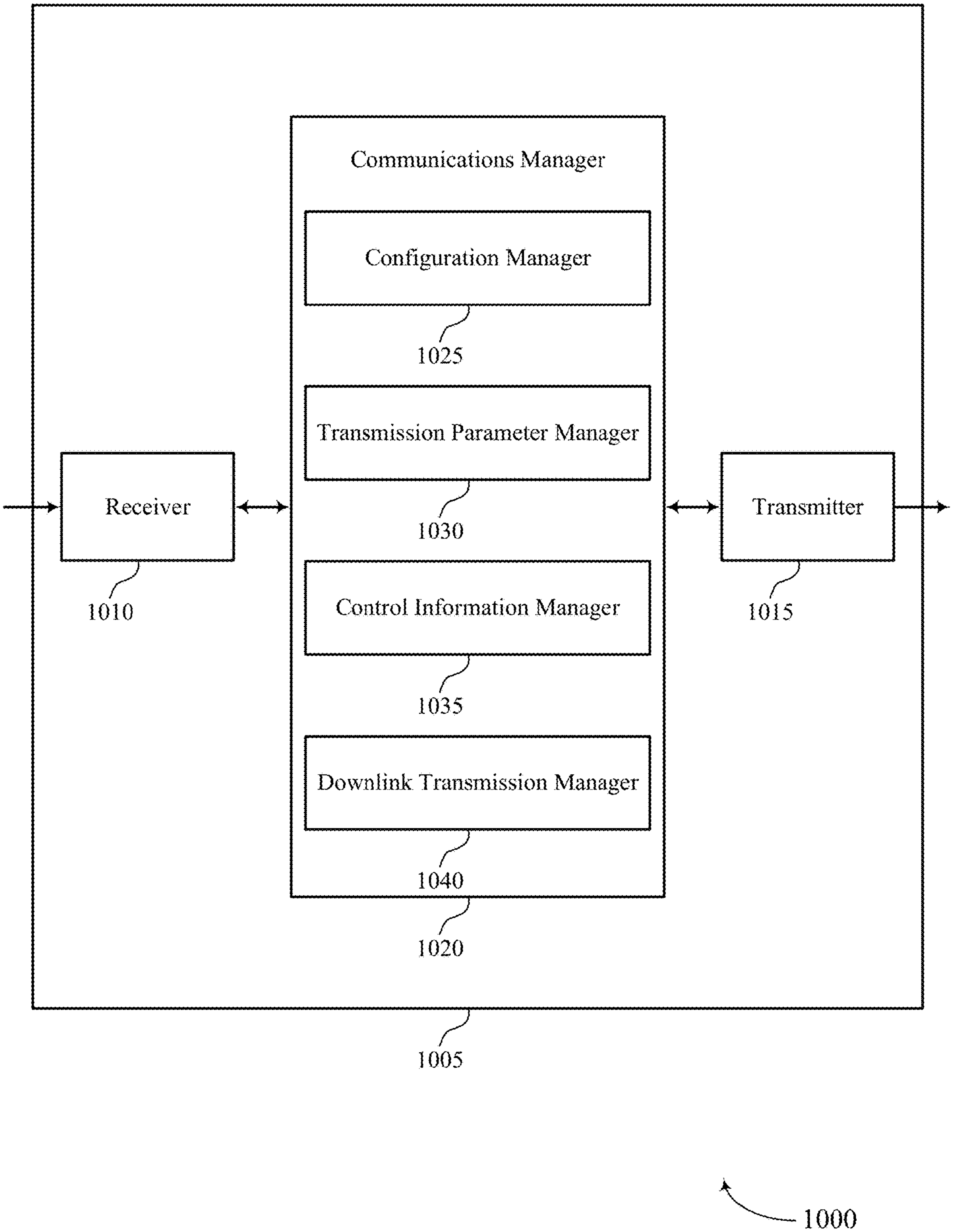

FIG. 10 shows a block diagram 1000 of a device 1005 that supports configuration and signaling for different modulation orders in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to configuration and signaling for different modulation orders). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to configuration and signaling for different modulation orders). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of configuration and signaling for different modulation orders as described herein. For example, the communications manager 1020 may include a configuration manager 1025, a transmission parameter manager 1030, a control information manager 1035, a downlink transmission manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration manager 1025 may be configured as or otherwise support a means for transmitting, to a UE, configuration information for two or more transmission parameter tables that provide one or more transmission parameters for two or more different modulation orders for communications between the base station and the UE. The transmission parameter manager 1030 may be configured as or otherwise support a means for selecting a first transmission parameter table of the two or more transmission parameter tables and a parameter index value from the first transmission parameter table for communications with the UE. The control information manager 1035 may be configured as or otherwise support a means for transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof. The downlink transmission manager 1040 may be configured as or otherwise support a means for transmitting a shared channel transmission to the UE based at least on part on a modulation order and target code rate that are indicated by the first transmission parameter table at an entry associated with the parameter index value.

Figure 11:
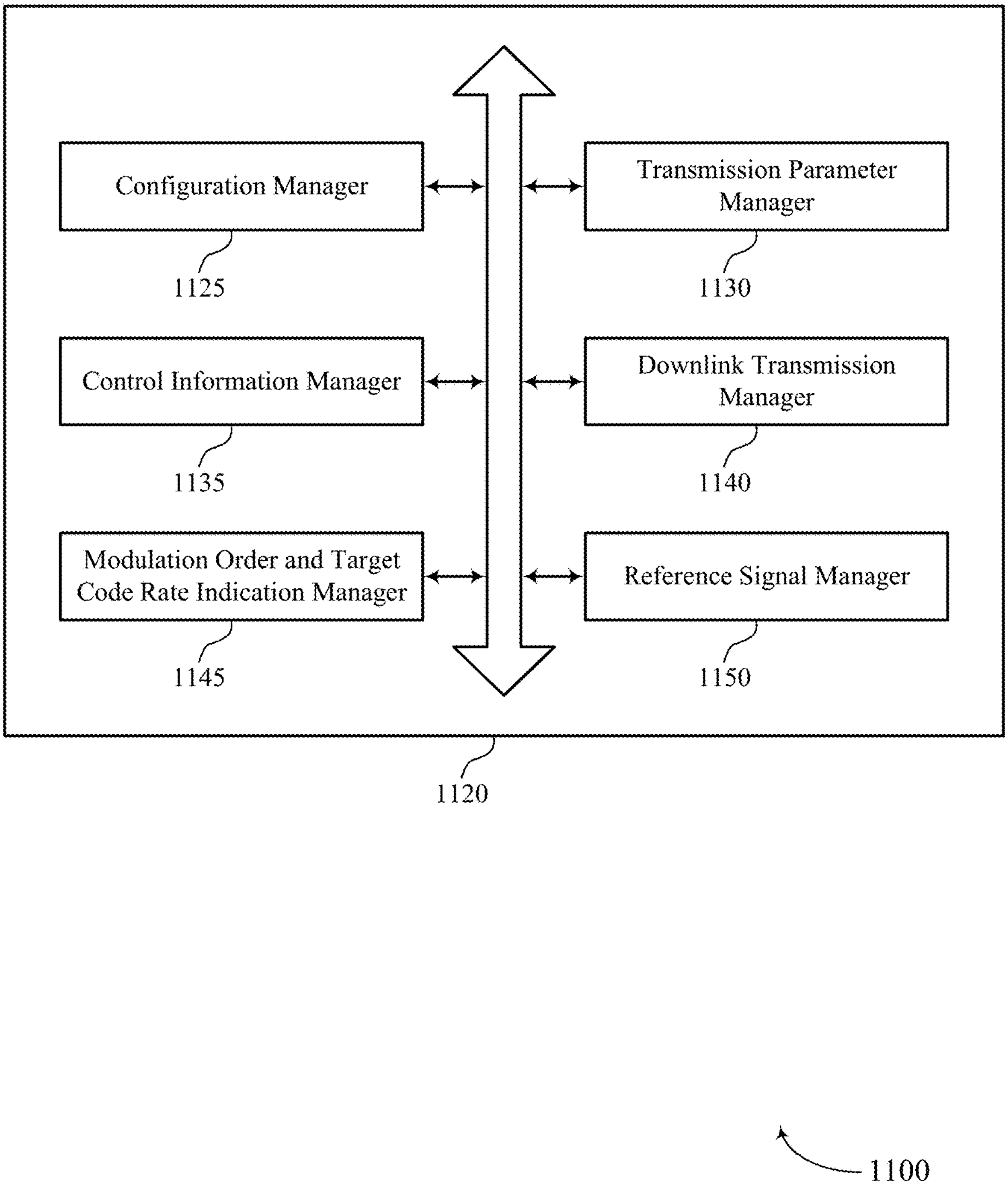
FIG. 11 shows a block diagram of a communications manager that supports configuration and signaling for different modulation orders in accordance with aspects of the present disclosure.

FIG. 11 shows a block diagram 1100 of a communications manager 1120 that supports configuration and signaling for different modulation orders in accordance with aspects of the present disclosure. The communications manager 1120 may be an example of aspects of a communications manager 920, a communications manager 1020, or both, as described herein. The communications manager 1120, or various components thereof, may be an example of means for performing various aspects of configuration and signaling for different modulation orders as described herein. For example, the communications manager 1120 may include a configuration manager 1125, a transmission parameter manager 1130, a control information manager 1135, a downlink transmission manager 1140, a modulation order and target code rate indication manager 1145, a reference signal manager 1150, or any combination thereof. Each of these components may communicate, directly or indirectly, with one another (e.g., via one or more buses).

The communications manager 1120 may support wireless communication at a base station in accordance with examples as disclosed herein. The configuration manager 1125 may be configured as or otherwise support a means for transmitting, to a UE, configuration information for two or more transmission parameter tables that provide one or more transmission parameters for two or more different modulation orders for communications between the base station and the UE. The transmission parameter manager 1130 may be configured as or otherwise support a means for selecting a first transmission parameter table of the two or more transmission parameter tables and a parameter index value from the first transmission parameter table for communications with the UE. The control information manager 1135 may be configured as or otherwise support a means for transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof. The downlink transmission manager 1140 may be configured as or otherwise support a means for transmitting a shared channel transmission to the UE based at least on part on a modulation order and target code rate that are indicated by the first transmission parameter table at an entry associated with the parameter index value.

In some examples, the parameter index value includes a first subset of bits and a second subset of bits, where the first subset of bits indicates a first type of transmission parameter table, and the second subset of bits that provide the parameter index value. In some examples, the second subset of bits include a number of bits that are based on a size of the first transmission parameter table. In some examples, the first transmission parameter table is selected based on a configuration of one or more higher modulation order transmission parameter tables. In some examples, the configuration information includes RRC configuration information for an PDSCH configuration. In some examples, the configuration information further includes RRC configuration information for a SPS configuration.

In some examples, the control signaling indicates the first transmission parameter table based on a set of rules and one or more of a higher layer parameter that configures one or more higher modulation order transmission parameter tables, a DCI format, whether the UE is configured with one or more types of RNTIs, or any combinations thereof. In some examples, the one or more higher modulation order transmission parameter tables include a combined transmission parameter table in which 1024QAM and 4096QAM modulation order parameters are combined into a single high SE table.

In some examples, the selecting the first transmission parameter table based on a reference signal density indicated by the reference signal configuration provided to the UE. In some examples, a higher order transmission parameter table is selected as the first transmission parameter table based on a PTRS configuration that provides a PTRS density that exceeds a threshold value. In some examples, the first transmission parameter table indicates a modulation order and code rate for uplink shared channel transmissions from the UE that use a modulation order of 256-QAM and 1024-QAM. In some examples, a set of multiple transmission parameter tables are configured separately for different frequency ranges used for communications between the UE and the base station, for different spectral efficiencies used for communications between the UE and the base station, or any combinations thereof.

Figure 12:
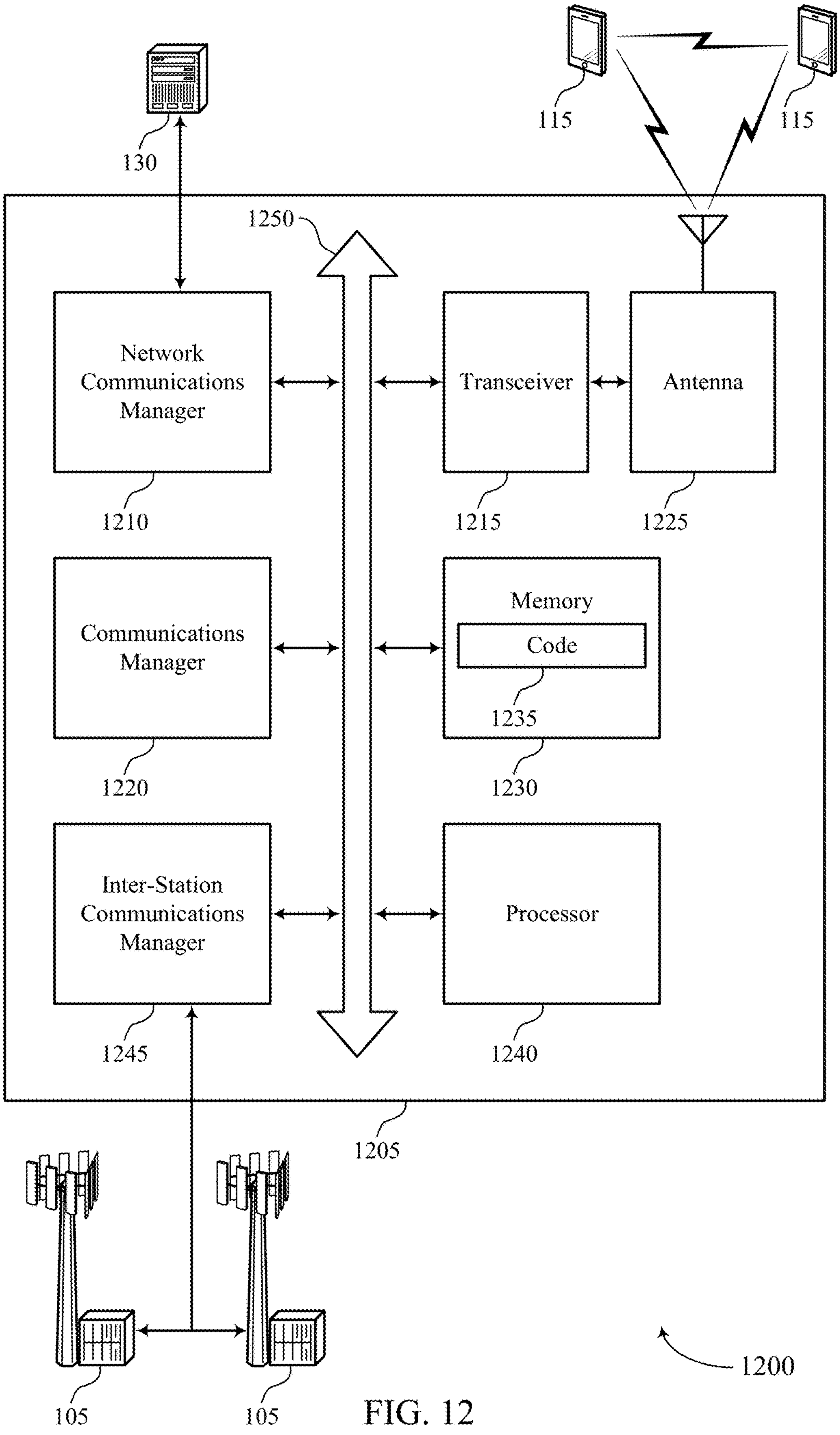
FIG. 12 shows a diagram of a system including a device that supports configuration and signaling for different modulation orders in accordance with aspects of the present disclosure.

FIG. 12 shows a diagram of a system 1200 including a device 1205 that supports configuration and signaling for different modulation orders in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting configuration and signaling for different modulation orders). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, configuration information for two or more transmission parameter tables that provide one or more transmission parameters for two or more different modulation orders for communications between the base station and the UE. The communications manager 1220 may be configured as or otherwise support a means for selecting a first transmission parameter table of the two or more transmission parameter tables and a parameter index value from the first transmission parameter table for communications with the UE. The communications manager 1220 may be configured as or otherwise support a means for transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof. The communications manager 1220 may be configured as or otherwise support a means for transmitting a shared channel transmission to the UE based at least on part on a modulation order and target code rate that are indicated by the first transmission parameter table at an entry associated with the parameter index value.

By including or configuring the communications manager 1220 in accordance with examples as described herein, the device 1205 may support techniques signaling of modulation order and code rates that are relatively finely tuned for channel conditions, which may provide improved communication reliability, reduced latency, improved user experience, reduced power consumption, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of configuration and signaling for different modulation orders as described herein, or the processor 1240 and the memory 1230 may be otherwise configured to perform or support such operations.

Figure 13:
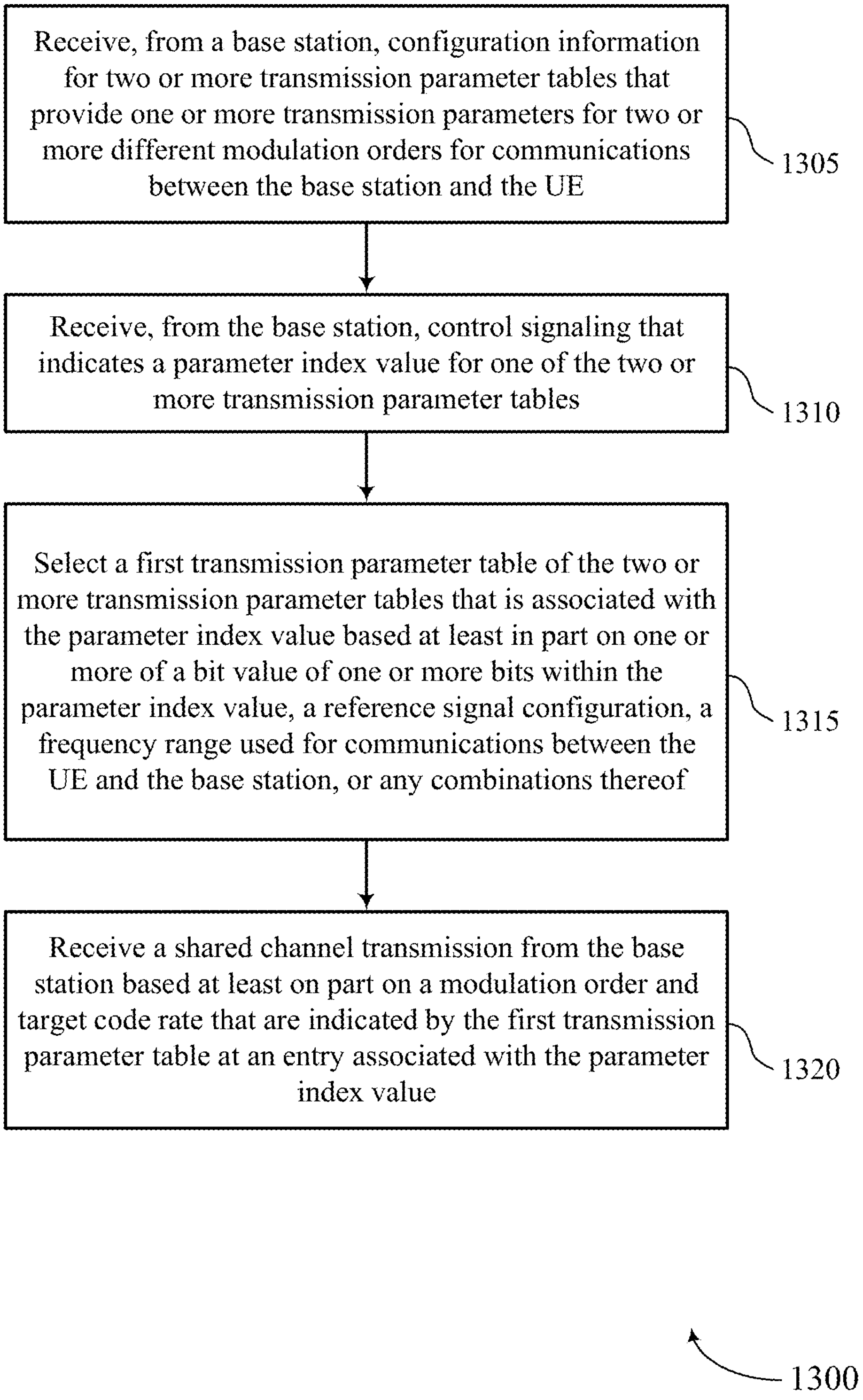
FIGS. 13 through 18 show flowcharts illustrating methods that support configuration and signaling for different modulation orders in accordance with aspects of the present disclosure.

FIG. 13 shows a flowchart illustrating a method 1300 that supports configuration and signaling for different modulation orders in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, configuration information for two or more transmission parameter tables that provide one or more transmission parameters for two or more different modulation orders for communications between the base station and the UE. The operations of 1305 may be performed in accordance with examples as disclosed herein. In some examples, aspects of the operations of 1305 may be performed by a configuration manager 725 as described with reference to FIG. 7.

At 1310, the method may include receiving, from the base station, control signaling that indicates a parameter index value for one of the two or more transmission parameter tables. The operations of 1310 may be performed in accordance with examples as disclosed herein. In some examples, aspects of the operations of 1310 may be performed by a control information manager 730 as described with reference to FIG. 7.

At 1315, the method may include selecting a first transmission parameter table of the two or more transmission parameter tables that is associated with the parameter index value based on one or more of a bit value of one or more bits within the parameter index value, a reference signal configuration, a frequency range used for communications between the UE and the base station, or any combinations thereof. The operations of 1315 may be performed in accordance with examples as disclosed herein. In some examples, aspects of the operations of 1315 may be performed by a transmission parameter manager 735 as described with reference to FIG. 7.

At 1320, the method may include receiving a shared channel transmission from the base station based at least on part on a modulation order and target code rate that are indicated by the first transmission parameter table at an entry associated with the parameter index value. The operations of 1320 may be performed in accordance with examples as disclosed herein. In some examples, aspects of the operations of 1320 may be performed by a decoding manager 740 as described with reference to FIG. 7.

Figure 14:
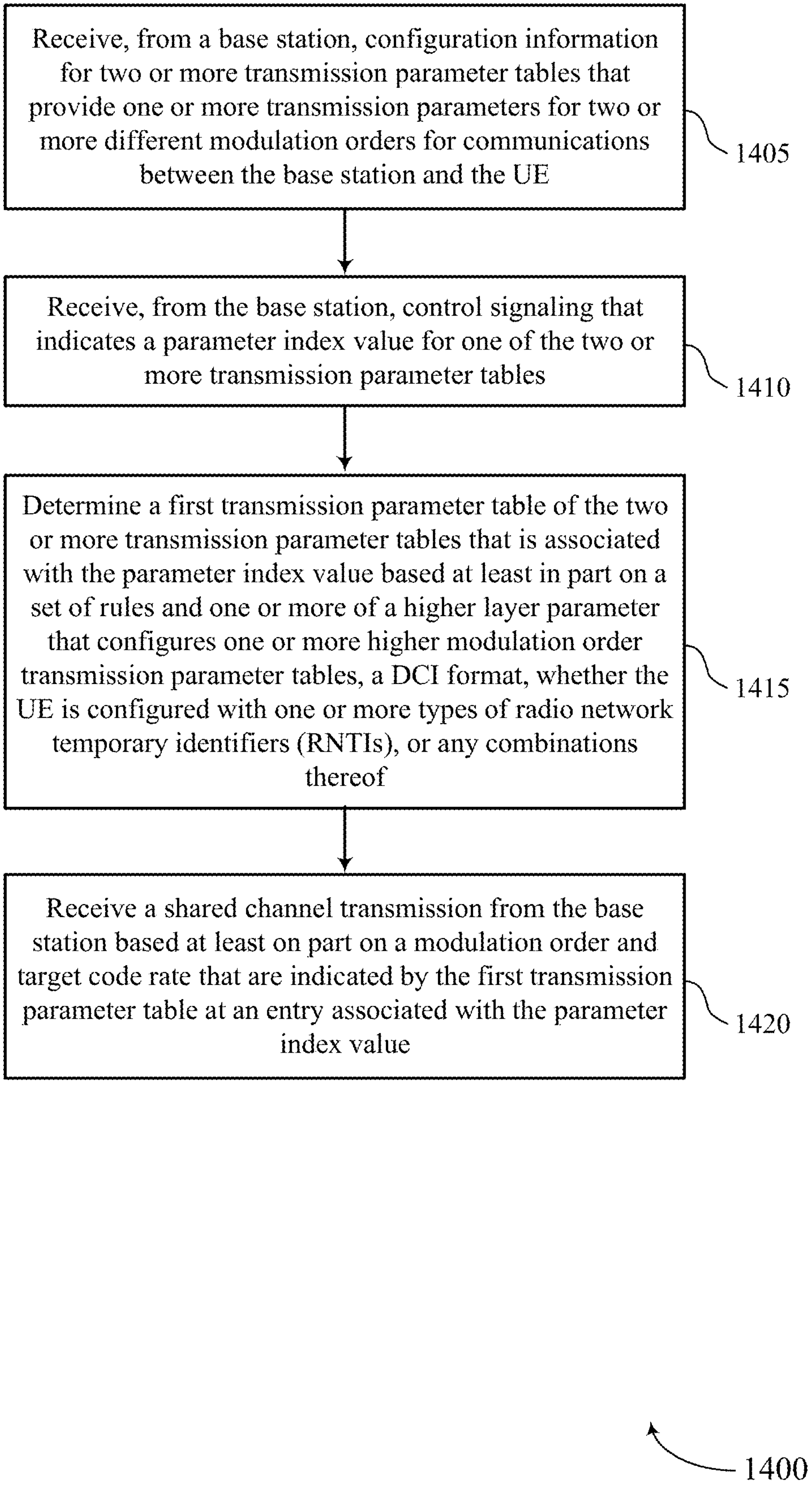

FIG. 14 shows a flowchart illustrating a method 1400 that supports configuration and signaling for different modulation orders in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, configuration information for two or more transmission parameter tables that provide one or more transmission parameters for two or more different modulation orders for communications between the base station and the UE. The operations of 1405 may be performed in accordance with examples as disclosed herein. In some examples, aspects of the operations of 1405 may be performed by a configuration manager 725 as described with reference to FIG. 7.

At 1410, the method may include receiving, from the base station, control signaling that indicates a parameter index value for one of the two or more transmission parameter tables. The operations of 1410 may be performed in accordance with examples as disclosed herein. In some examples, aspects of the operations of 1410 may be performed by a control information manager 730 as described with reference to FIG. 7.

At 1415, the method may include determining a first transmission parameter table of the two or more transmission parameter tables that is associated with the parameter index value based at least in part on a set of rules and one or more of a higher layer parameter that configures one or more higher modulation order transmission parameter tables, a DCI format, whether the UE is configured with one or more types of radio network temporary identifiers (RNTIs), or any combinations thereof. The operations of 1415 may be performed in accordance with examples as disclosed herein. In some examples, aspects of the operations of 1415 may be performed by a modulation order and target code rate determination manager 745 as described with reference to FIG. 7.

At 1420, the method may include receiving a shared channel transmission from the base station based at least on part on a modulation order and target code rate that are indicated by the first transmission parameter table at an entry associated with the parameter index value. The operations of 1420 may be performed in accordance with examples as disclosed herein. In some examples, aspects of the operations of 1420 may be performed by a decoding manager 740 as described with reference to FIG. 7.

Figure 15:
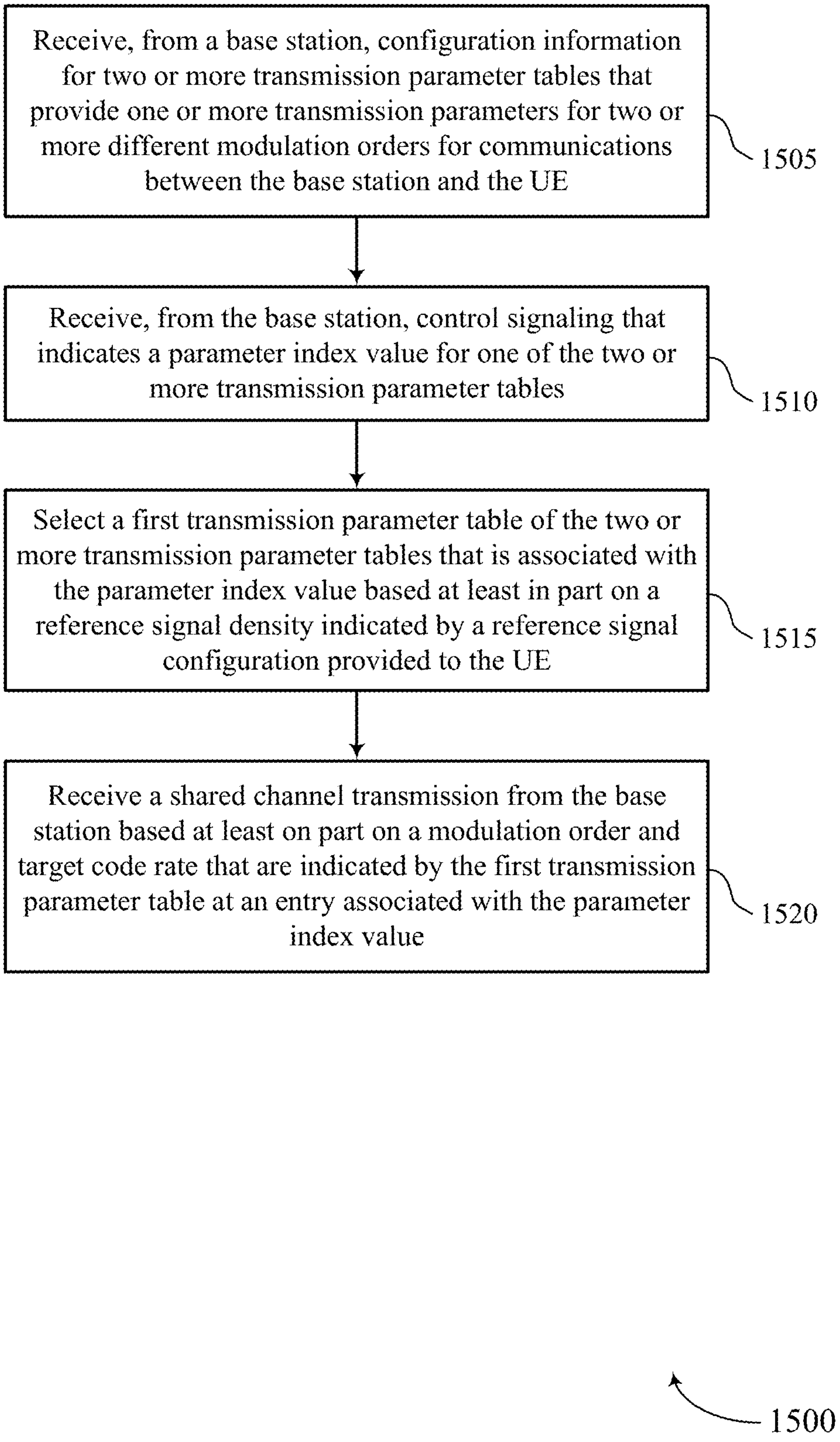

FIG. 15 shows a flowchart illustrating a method 1500 that supports configuration and signaling for different modulation orders in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, configuration information for two or more transmission parameter tables that provide one or more transmission parameters for two or more different modulation orders for communications between the base station and the UE. The operations of 1505 may be performed in accordance with examples as disclosed herein. In some examples, aspects of the operations of 1505 may be performed by a configuration manager 725 as described with reference to FIG. 7.

At 1510, the method may include receiving, from the base station, control signaling that indicates a parameter index value for one of the two or more transmission parameter tables. The operations of 1510 may be performed in accordance with examples as disclosed herein. In some examples, aspects of the operations of 1510 may be performed by a control information manager 730 as described with reference to FIG. 7.

At 1515, the method may include selecting a first transmission parameter table of the two or more transmission parameter tables that is associated with the parameter index value based at least in part on a reference signal density indicated by a reference signal configuration provided to the UE. The operations of 1515 may be performed in accordance with examples as disclosed herein. In some examples, aspects of the operations of 1515 may be performed by a reference signal manager 750 as described with reference to FIG. 7.

At 1520, the method may include receiving a shared channel transmission from the base station based at least on part on a modulation order and target code rate that are indicated by the first transmission parameter table at an entry associated with the parameter index value. The operations of 1520 may be performed in accordance with examples as disclosed herein. In some examples, aspects of the operations of 1520 may be performed by a decoding manager 740 as described with reference to FIG. 7.

Figure 16:
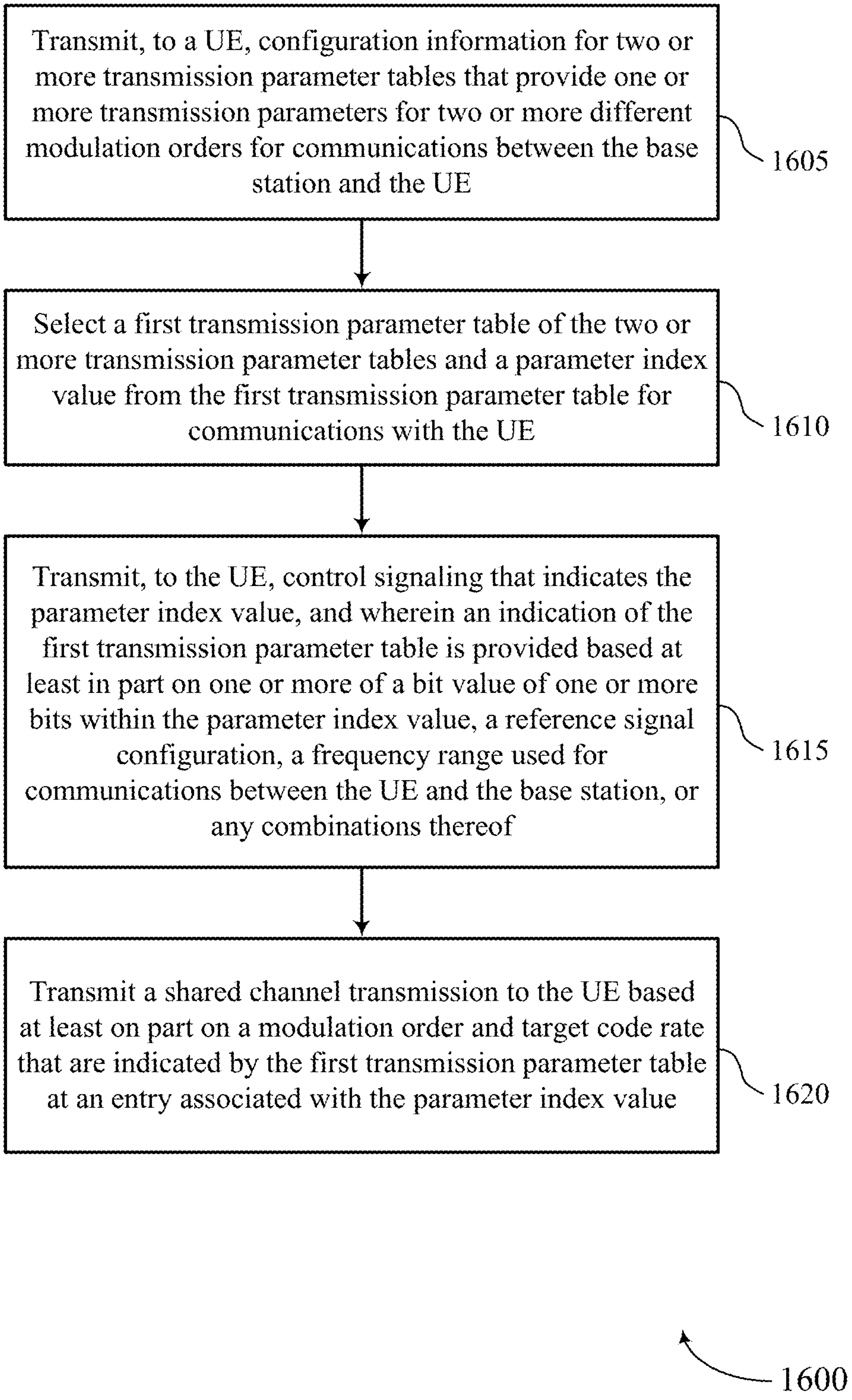

FIG. 16 shows a flowchart illustrating a method 1600 that supports configuration and signaling for different modulation orders in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, configuration information for two or more transmission parameter tables that provide one or more transmission parameters for two or more different modulation orders for communications between the base station and the UE. The operations of 1605 may be performed in accordance with examples as disclosed herein. In some examples, aspects of the operations of 1605 may be performed by a configuration manager 1125 as described with reference to FIG. 11.

At 1610, the method may include selecting a first transmission parameter table of the two or more transmission parameter tables and a parameter index value from the first transmission parameter table for communications with the UE. The operations of 1610 may be performed in accordance with examples as disclosed herein. In some examples, aspects of the operations of 1610 may be performed by a transmission parameter manager 1130 as described with reference to FIG. 11.

At 1615, the method may include transmitting, to the UE, control signaling that indicates the parameter index value, and where an indication of the first transmission parameter table is provided based on one or more of a bit value of one or more bits within the parameter index value, a reference signal configuration, a frequency range used for communications between the UE and the base station, or any combinations thereof. The operations of 1615 may be performed in accordance with examples as disclosed herein. In some examples, aspects of the operations of 1615 may be performed by a control information manager 1135 as described with reference to FIG. 11.

At 1620, the method may include transmitting a shared channel transmission to the UE based at least on part on a modulation order and target code rate that are indicated by the first transmission parameter table at an entry associated with the parameter index value. The operations of 1620 may be performed in accordance with examples as disclosed herein. In some examples, aspects of the operations of 1620 may be performed by a downlink transmission manager 1140 as described with reference to FIG. 11.

Figure 17:
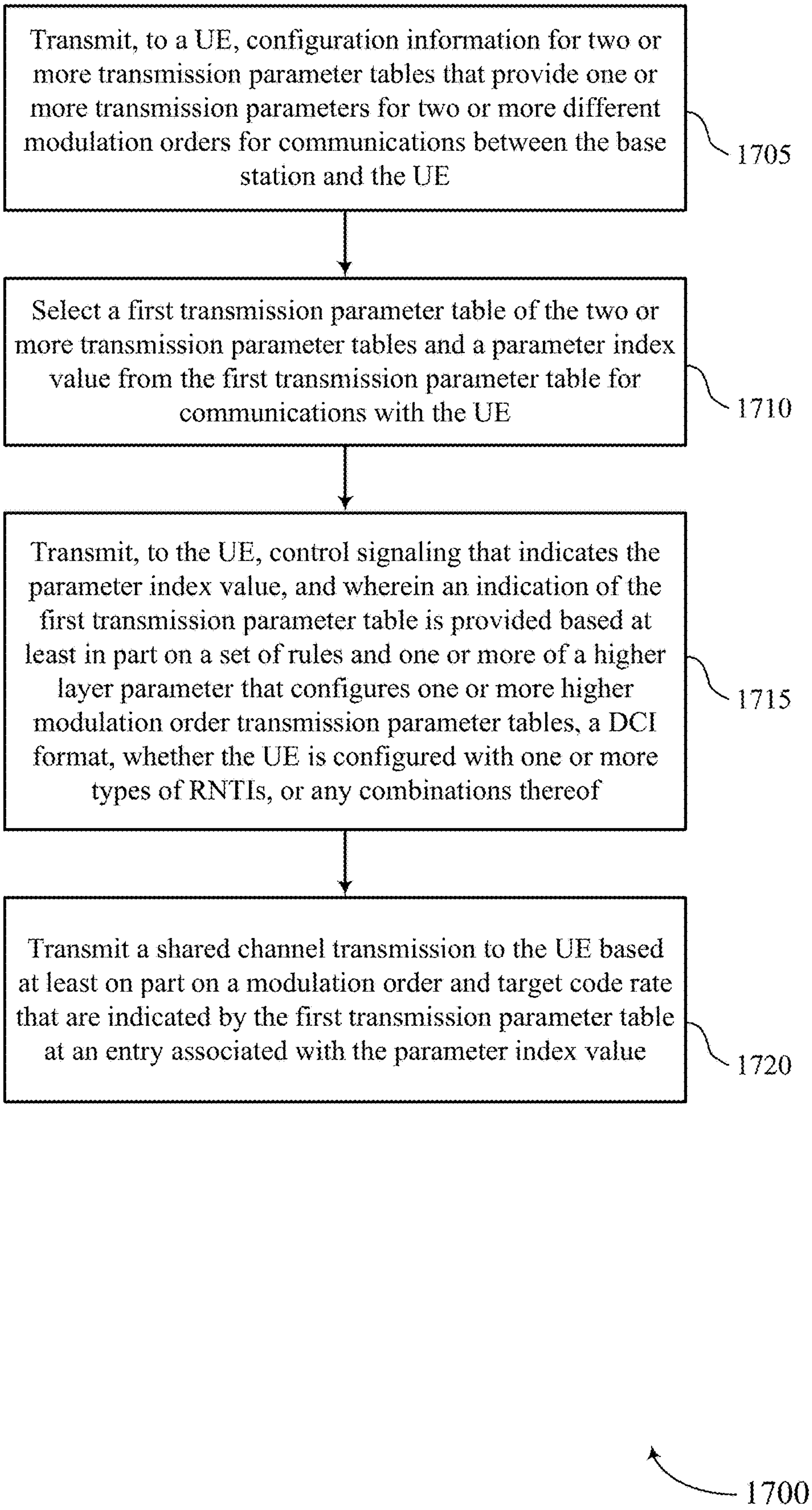

FIG. 17 shows a flowchart illustrating a method 1700 that supports configuration and signaling for different modulation orders in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, configuration information for two or more transmission parameter tables that provide one or more transmission parameters for two or more different modulation orders for communications between the base station and the UE. The operations of 1705 may be performed in accordance with examples as disclosed herein. In some examples, aspects of the operations of 1705 may be performed by a configuration manager 1125 as described with reference to FIG. 11.

At 1710, the method may include selecting a first transmission parameter table of the two or more transmission parameter tables and a parameter index value from the first transmission parameter table for communications with the UE. The operations of 1710 may be performed in accordance with examples as disclosed herein. In some examples, aspects of the operations of 1710 may be performed by a transmission parameter manager 1130 as described with reference to FIG. 11.

At 1715, the method may include transmitting, to the UE, control signaling that indicates the parameter index value, where an indication of the first transmission parameter table is provided based at least in part on a set of rules and one or more of a higher layer parameter that configures one or more higher modulation order transmission parameter tables, a DCI format, whether the UE is configured with one or more types of RNTIs, or any combinations thereof. The operations of 1715 may be performed in accordance with examples as disclosed herein. In some examples, aspects of the operations of 1715 may be performed by a control information manager 1135 as described with reference to FIG. 11.

At 1720, the method may include transmitting a shared channel transmission to the UE based at least on part on a modulation order and target code rate that are indicated by the first transmission parameter table at an entry associated with the parameter index value. The operations of 1720 may be performed in accordance with examples as disclosed herein. In some examples, aspects of the operations of 1720 may be performed by a downlink transmission manager 1140 as described with reference to FIG. 11.

Figure 18:
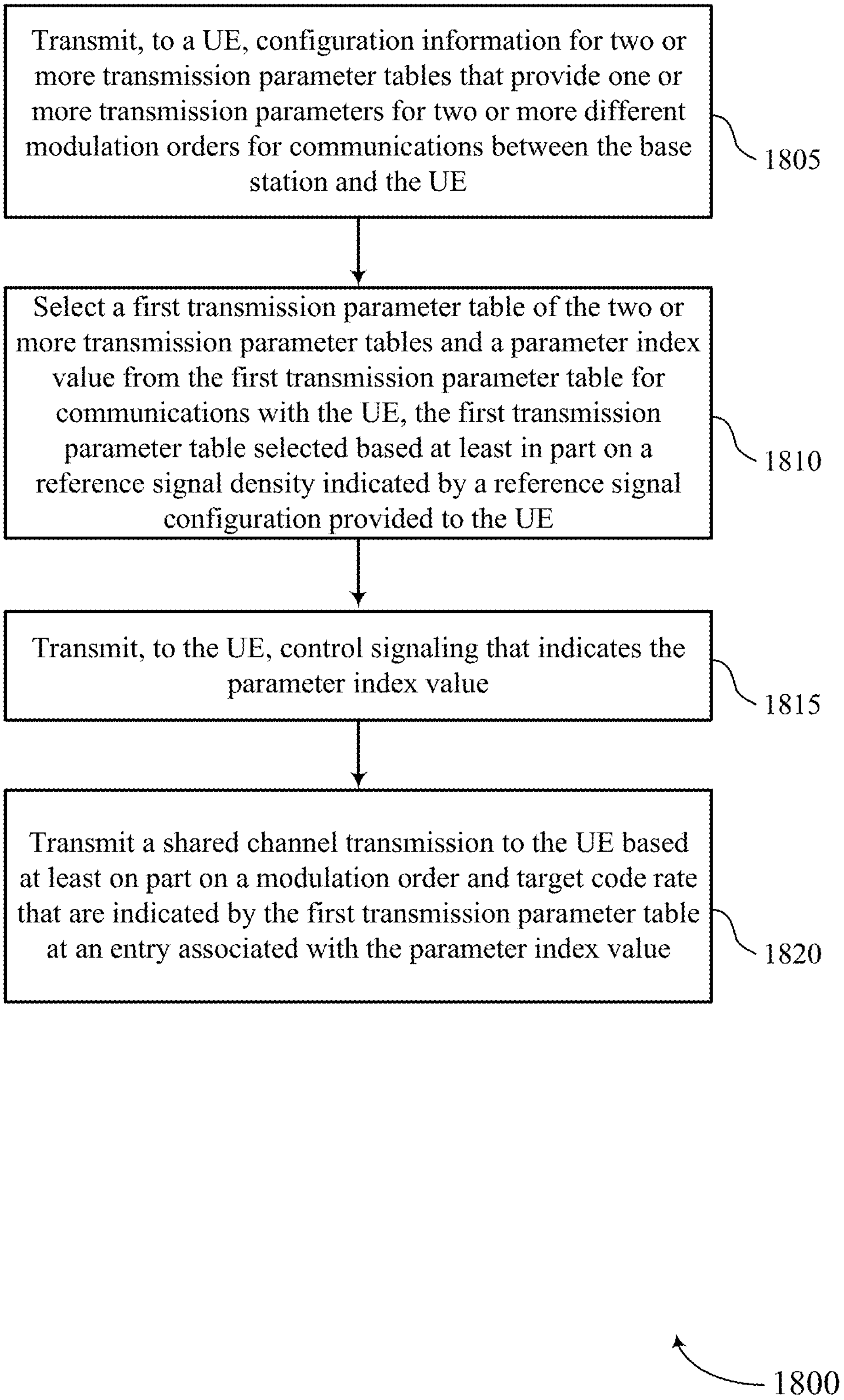

FIG. 18 shows a flowchart illustrating a method 1800 that supports configuration and signaling for different modulation orders in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, configuration information for two or more transmission parameter tables that provide one or more transmission parameters for two or more different modulation orders for communications between the base station and the UE. The operations of 1805 may be performed in accordance with examples as disclosed herein. In some examples, aspects of the operations of 1805 may be performed by a configuration manager 1125 as described with reference to FIG. 11.

At 1810, the method may include selecting a first transmission parameter table of the two or more transmission parameter tables and a parameter index value from the first transmission parameter table for communications with the UE, the first transmission parameter table selected based at least in part on a reference signal density indicated by a reference signal configuration provided to the UE. The operations of 1810 may be performed in accordance with examples as disclosed herein. In some examples, aspects of the operations of 1810 may be performed by a transmission parameter manager 1130 as described with reference to FIG. 11.

At 1815, the method may include transmitting, to the UE, control signaling that indicates the parameter index value. The operations of 1815 may be performed in accordance with examples as disclosed herein. In some examples, aspects of the operations of 1815 may be performed by a control information manager 1135 as described with reference to FIG. 11.

At 1820, the method may include transmitting a shared channel transmission to the UE based at least on part on a modulation order and target code rate that are indicated by the first transmission parameter table at an entry associated with the parameter index value. The operations of 1820 may be performed in accordance with examples as disclosed herein. In some examples, aspects of the operations of 1820 may be performed by a downlink transmission manager 1140 as described with reference to FIG. 11.

The following provides an overview of aspects of the present disclosure:

Aspect 1: A method for wireless communication at a UE, comprising: receiving, from a base station, configuration information for two or more transmission parameter tables that provide one or more transmission parameters for two or more different modulation orders for communications between the base station and the UE; receiving, from the base station, control signaling that indicates a parameter index value for one of the two or more transmission parameter tables; selecting a first transmission parameter table of the two or more transmission parameter tables that is associated with the parameter index value based at least in part on one or more of a bit value of one or more bits within the parameter index value, a reference signal configuration, a frequency range used for communications between the UE and the base station, or any combinations thereof; and receiving a shared channel transmission from the base station based at least on part on a modulation order and target code rate that are indicated by the first transmission parameter table at an entry associated with the parameter index value.

Aspect 2: The method of aspect 1, wherein the parameter index value includes a first subset of bits and a second subset of bits, wherein the first subset of bits indicates a first type of transmission parameter table, and the second subset of bits that provide the parameter index value.

Aspect 3: The method of aspect 2, wherein the second subset of bits include a number of bits that are based at least in part on a size of the first transmission parameter table.

Aspect 4: The method of any of aspects 1 through 3, wherein the first transmission parameter table is selected based at least in part on a configuration of one or more higher modulation order transmission parameter tables.

Aspect 5: The method of aspect 4, wherein the configuration information includes RRC configuration information for an PDSCH configuration.

Aspect 6: The method of aspect 5, wherein the configuration information further includes RRC configuration information for a SPS configuration.

Aspect 7: The method of any of aspects 1 through 6, wherein the selecting the first transmission parameter table is based at least in part on a set of rules and one or more of a higher layer parameter that configures one or more higher modulation order transmission parameter tables, a DCI format, whether the UE is configured with one or more types of RNTIs, or any combinations thereof.

Aspect 8: The method of aspect 7, wherein the one or more higher modulation order transmission parameter tables include a combined transmission parameter table in which 1024QAM and 4096QAM modulation order parameters are combined into a single high SE table.

Aspect 9: The method of any of aspects 1 through 6, wherein the selecting the first transmission parameter table is based at least in part on a reference signal density indicated by the reference signal configuration provided to the UE.

Aspect 10: The method of aspect 9, wherein a higher order transmission parameter table is selected as the first transmission parameter table based at least in part on a PTRS configuration that provides a PTRS density that exceeds a threshold value.

Aspect 11: The method of any of aspects 1 through 10, wherein the first transmission parameter table indicates a modulation order and code rate for uplink shared channel transmissions from the UE that use a modulation order of 256QAM and 1024QAM.

Aspect 12: The method of any of aspects 1 through 11, wherein a plurality of transmission parameter tables are configured separately for different frequency ranges used for communications between the UE and the base station, for different spectral efficiencies used for communications between the UE and the base station, or any combinations thereof.

Aspect 13: A method for wireless communication at a base station, comprising: transmitting, to a UE, configuration information for two or more transmission parameter tables that provide one or more transmission parameters for two or more different modulation orders for communications between the base station and the UE; selecting a first transmission parameter table of the two or more transmission parameter tables and a parameter index value from the first transmission parameter table for communications with the UE; transmitting, to the UE, control signaling that indicates the parameter index value, and wherein an indication of the first transmission parameter table is provided based at least in part on one or more of a bit value of one or more bits within the parameter index value, a reference signal configuration, a frequency range used for communications between the UE and the base station, or any combinations thereof; and transmitting a shared channel transmission to the UE based at least on part on a modulation order and target code rate that are indicated by the first transmission parameter table at an entry associated with the parameter index value.

Aspect 14: The method of aspect 13, wherein the parameter index value includes a first subset of bits and a second subset of bits, wherein the first subset of bits indicates a first type of transmission parameter table, and the second subset of bits that provide the parameter index value.

Aspect 15: The method of aspect 14, wherein the second subset of bits include a number of bits that are based at least in part on a size of the first transmission parameter table.

Aspect 16: The method of any of aspects 13 through 15, wherein the first transmission parameter table is selected based at least in part on a configuration of one or more higher modulation order transmission parameter tables.

Aspect 17: The method of aspect 16, wherein the configuration information includes RRC configuration information for an PDSCH configuration.

Aspect 18: The method of aspect 17, wherein the configuration information further includes RRC configuration information for a SPS configuration.

Aspect 19: The method of any of aspects 13 through 18, wherein the control signaling indicates the first transmission parameter table based at least in part on a set of rules and one or more of a higher layer parameter that configures one or more higher modulation order transmission parameter tables, a DCI format, whether the UE is configured with one or more types of RNTIs, or any combinations thereof.

Aspect 20: The method of aspect 19, wherein the one or more higher modulation order transmission parameter tables include a combined transmission parameter table in which 1024QAM and 4096QAM modulation order parameters are combined into a single high SE table.

Aspect 21: The method of any of aspects 13 through 18, wherein the selecting the first transmission parameter table is based at least in part on a reference signal density indicated by the reference signal configuration provided to the UE.

Aspect 22: The method of aspect 21, wherein a higher order transmission parameter table is selected as the first transmission parameter table based at least in part on a phase tracking reference signal (PTRS) configuration that provides a PTRS density that exceeds a threshold value.

Aspect 23: The method of any of aspects 13 through 22, wherein the first transmission parameter table indicates a modulation order and code rate for uplink shared channel transmissions from the UE that use a modulation order of 256QAM and 1024QAM.

Aspect 24: The method of any of aspects 13 through 23, wherein a plurality of transmission parameter tables are configured separately for different frequency ranges used for communications between the UE and the base station, for different spectral efficiencies used for communications between the UE and the base station, or any combinations thereof.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive control signaling that indicates a parameter index value associated with two or more transmission parameter tables, wherein the two or more transmission parameter tables provide one or more transmission parameters for two or more different modulation orders for wireless communications between the UE and one or more other devices;

select a first transmission parameter table of the two or more transmission parameter tables that is associated with the parameter index value based at least in part on one or more of a bit value of a first subset of bits within the parameter index value, a reference signal configuration, a frequency range used for communications between the UE and the one or more other devices, or any combinations thereof; and receive a wireless transmission based at least in part on a modulation order and target code rate that are indicated by the first transmission parameter table at an entry indicated by a second subset of bits of the parameter index value.

2. The UE of claim 1, wherein the second subset of bits include a number of bits that are based at least in part on a size of the first transmission parameter table.

3. The UE of claim 1, wherein the first transmission parameter table is selected based at least in part on a configuration of one or more higher modulation order transmission parameter tables.

4. The UE of claim 3, wherein an indication of the two or more transmission parameter tables is provided in radio resource control (RRC) configuration information for a physical downlink shared channel (PDSCH) configuration.

5. The UE of claim 4, wherein the RRC configuration information is provided for a semi-persistent scheduling (SPS) configuration.

6. The UE of claim 1, wherein selection of the first transmission parameter table is based at least in part on a set of rules and one or more of a higher layer parameter that configures one or more higher modulation order transmission parameter tables, a downlink control information (DCI) format, whether the UE is configured with one or more types of radio network temporary identifiers (RNTIs), or any combinations thereof.

7. The UE of claim 6, wherein the one or more higher modulation order transmission parameter tables include a combined transmission parameter table in which 1024QAM and 4096QAM modulation order parameters are combined into a single high spectral efficiency (SE) table.

8. The UE of claim 1, wherein selection of the first transmission parameter table is based at least in part on a reference signal density indicated by the reference signal configuration provided to the UE.

9. The UE of claim 8, wherein a higher order transmission parameter table is selected as the first transmission parameter table based at least in part on a phase tracking reference signal (PTRS) configuration that provides a PTRS density that exceeds a threshold value.

10. The UE of claim 1, wherein the first transmission parameter table indicates a modulation order and code rate for uplink shared channel transmissions from the UE that use a modulation order of 256QAM and 1024QAM.

11. The UE of claim 1, wherein a plurality of transmission parameter tables are configured separately for different frequency ranges used for communications between the UE and the one or more other devices, for different spectral efficiencies used for communications between the UE and the one or more other devices, or any combinations thereof.

12. A network entity, comprising:

one or more memories storing processor-executable code; and one or more processors coupled with the one or more memories and individually or collectively operable to execute the code to cause the network entity to:

select a first transmission parameter table of two or more transmission parameter tables and a parameter index value from the first transmission parameter table for communications with a user equipment (UE), wherein the two or more transmission parameter tables provide one or more transmission parameters for two or more different modulation orders for communications between the UE and one or more other devices; and transmit, to the UE, control signaling that indicates the parameter index value, wherein an indication of the first transmission parameter table is provided based at least in part on one or more of a bit value of a first subset of bits within the parameter index value, a reference signal configuration, a frequency range used for communications between the UE and the one or more other devices, or any combinations thereof, and wherein wireless communications between the UE and the one or more other devices is based at least on part on a modulation order and target code rate that are indicated by the first transmission parameter table at an entry indicated by a second subset of bits of the parameter index value.

13. The network entity of claim 12, wherein the second subset of bits include a number of bits that are based at least in part on a size of the first transmission parameter table.

14. The network entity of claim 12, wherein the first transmission parameter table is selected based at least in part on a configuration of one or more higher modulation order transmission parameter tables.

15. The network entity of claim 14, wherein an indication of the two or more transmission parameter tables is provided in radio resource control (RRC) configuration information for a physical downlink shared channel (PDSCH) configuration.

16. The network entity of claim 12, wherein the control signaling indicates the first transmission parameter table based at least in part on a set of rules and one or more of a higher layer parameter that configures one or more higher modulation order transmission parameter tables, a downlink control information (DCI) format, whether the UE is configured with one or more types of radio network temporary identifiers (RNTIs), or any combinations thereof.

17. The network entity of claim 12, wherein selection of the first transmission parameter table is based at least in part on a reference signal density indicated by the reference signal configuration provided to the UE.

18. A method for wireless communication at a user equipment (UE), comprising:

receiving control signaling that indicates a parameter index value associated with two or more transmission parameter tables, wherein the two or more transmission parameter tables provide one or more transmission parameters for two or more different modulation orders for wireless communications between the UE and one or more other devices;

selecting a first transmission parameter table of the two or more transmission parameter tables that is associated with the parameter index value based at least in part on one or more of a bit value of a first subset of bits within the parameter index value, a reference signal configuration, a frequency range used for communications between the UE and the one or more other devices, or any combinations thereof; and receiving a wireless transmission based at least on part on a modulation order and target code rate that are indicated by the first transmission parameter table at an entry indicated by a second subset of bits of the parameter index value.

* * * * *